United States Patent [19]

Girgis et al.

[11] 4,455,612

[45] Jun. 19, 1984

[54] RECURSIVE ESTIMATION IN DIGITAL DISTANCE RELAYING SYSTEM

[75] Inventors: Adly A. Girgis, Raleigh, N.C.; Robert G. Brown, Ames, Iowa

[73] Assignee: Iowa State University Research Foundation, Inc., Ames, Iowa

[21] Appl. No.: 343,356

[22] Filed: Jan. 27, 1982

[51] Int. Cl.$^3$ .......................... H02H 3/18; G06F 15/20
[52] U.S. Cl. ...................................... 364/483; 324/52; 361/80; 364/492
[58] Field of Search ............... 364/480, 481, 483, 492; 361/80; 324/51, 52

[56] References Cited

U.S. PATENT DOCUMENTS

| | | | |
|---|---|---|---|
| 3,569,785 | 3/1971 | Durbeck et al. | 317/27 |
| 3,593,124 | 7/1971 | Cahen et al. | 324/52 |
| 3,599,044 | 8/1971 | Takemura | 317/36 D |
| 3,612,989 | 10/1971 | Souillard et al. | 324/52 |
| 3,723,864 | 3/1973 | Ricard | 324/52 |
| 3,731,152 | 5/1973 | Rockefeller, Jr. | 317/27 R |
| 3,735,204 | 5/1973 | Maenicke | 317/27 R |
| 3,885,199 | 5/1975 | Nohara et al. | 364/481 |
| 3,984,737 | 10/1976 | Okamura et al. | 317/36 D |
| 4,107,778 | 8/1978 | Nii et al. | 364/492 |
| 4,261,038 | 4/1981 | Johns et al. | 364/482 |
| 4,357,666 | 11/1982 | Matsushima et al. | 361/80 |

OTHER PUBLICATIONS

"Application of Kalman Filtering in Computer Relaying", by Girgis et al., *IEEE Trans. Power Apparatus and Systems*, vol. PAS-100, No. 7, Jul. 1981, pp. 3387-3397.
*Stochastic Processes and Filtering Theory*, by A. H. Jazwinski, Academic Press, N.Y., 1970, pp. 1-7, 266-269.
*Applied Optimal Estimation*, by A. Gelb, ed., M.I.T. Press, 1974, pp. 1-7, 107-113, 229-231, and 308-311.
*Stochastic Optimal Linear Estimation and Control*, by J. S. Meditch, McGraw-Hill, N.Y., 1969, pp. 1-8 and 182-185.
"Identification of Parameters for Power System Stability Analysis Using Kalman Filter", by M. Namba et al., *IEEE Trans. Power Apparatus and Systems*, vol. PAS-100, No. 7, Jul. 1981, pp. 3304-3311.
"Application of Digital Kalman Filters in Phase-Measuring Techniques" by A. D. Nizhenskii, *Izmeritel'naya Tekhika*, No. 9, pp. 51-53, Sep. 1079, translated in *Measurement Techniques*, vol. 22, No. 9, Feb. 1980, pp. 1102-1106.
"On-Line Relaying With a Digital Computer" by G. B. Gilcrest et al., Silent Sentinels, Aug. 1971, pp. 1-17.
"The Development and Selection of Algorithms for Relaying of Transmission Lines by Digital Computer" by J. G. Gilbert et al., 1978, pp. 83-125.
"The Laboratory Investigation of a Digital System for the Protection of Transmission Lines" by W. D. Breingan et al., *IEEE Transactions on Power Apparatus and Systems*, vol. PAS-98, No. 2, pp. 350-368, Mar./Apr. 1979.
*Application of Brown*, 477 Federal Reporter, 2nd Series, pp. 946-952, U.S. Court of Customs and Patent Appeals, 1973.
Transcript of Record, U.S. Court of Customs and Patent Appeals, Patent Appeal Docket No. 8887, In the Matter of the Application of Robert G. Brown, pp. 6-13, 1972.

*Primary Examiner*—Errol A. Krass
*Assistant Examiner*—Clifford L. Tager
*Attorney, Agent, or Firm*—Senniger, Powers, Leavitt and Roedel

[57] ABSTRACT

Digital distance relaying of a three-phase electric power transmission line depends on accurate estimation of the postfault voltage and current phasors during the first postfault electrical cycle, when the line voltages and currents are corrupted by noise and transients. The digital relay herein responds to each postfault sample as it arrives and recursively electronically estimates the postfault phasors before the next sample arrives. The method involves a powerful state variable approach which for the voltages provides at least two state variables per voltage, and for the currents provides at least three state variables per current. Parallel processing of the samples equalizes computer burden, and an additional processor classifies the fault, computes faulted line resistance and reactance, relays the fault by tripping a circuit breaker, and documents the fault including its distance. Numerical results of part of the powerful estimation procedure which can be performed offline are prestored in the system, to permit the balance of the estimation procedure to occur in real-time, with slower inexpensive processing hardware. Relaying is expected within the first half of the first postfault electrical cycle for most Zone 1 faults.

10 Claims, 18 Drawing Figures

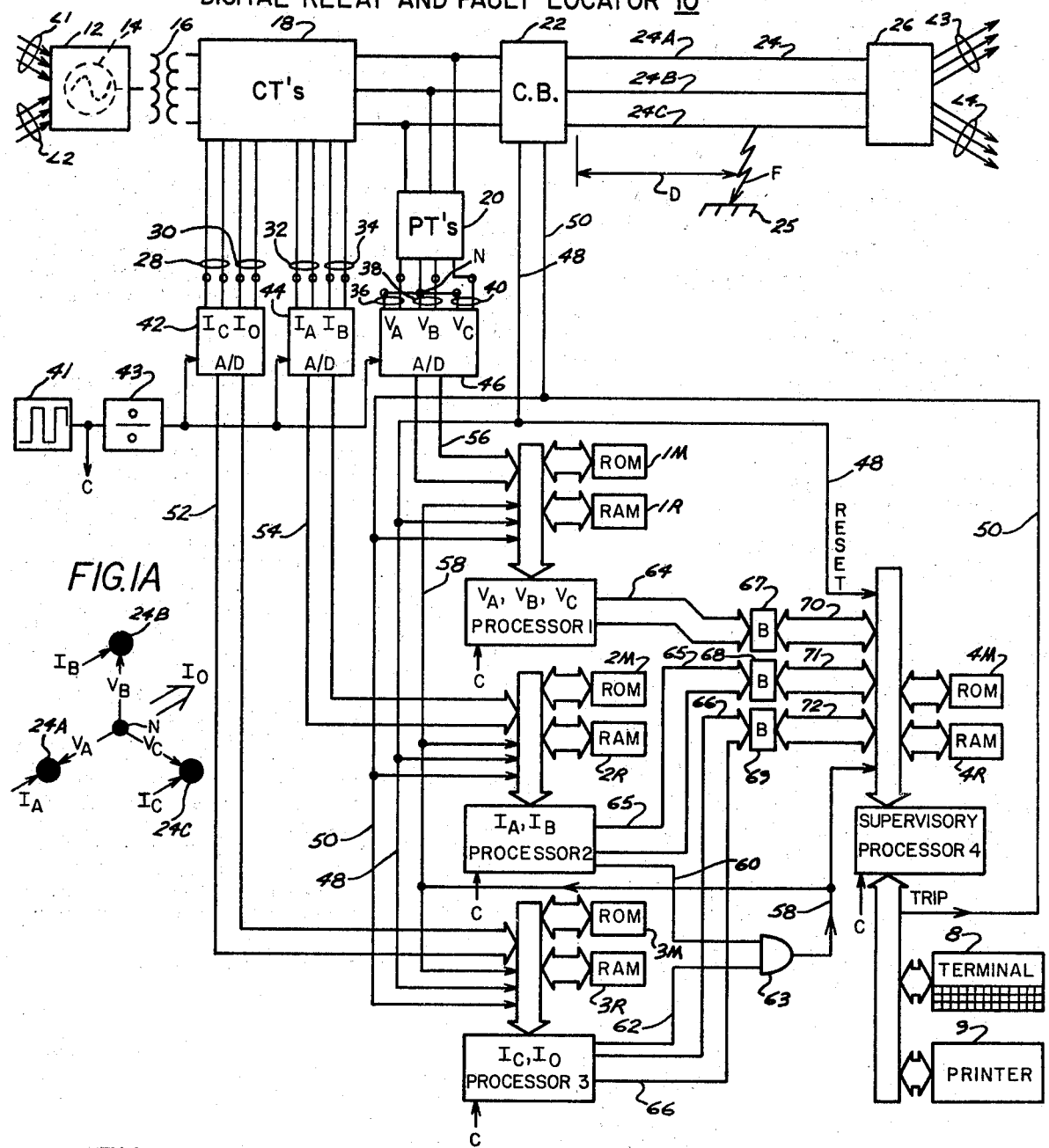
FIG. 1
DIGITAL RELAY AND FAULT LOCATOR 10
FIG. 1A
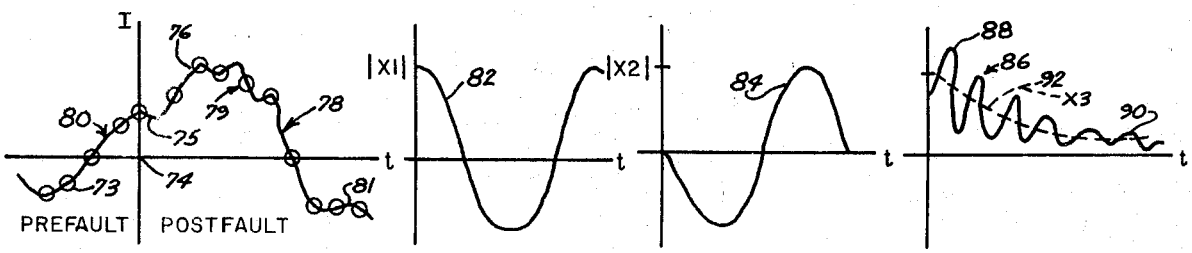
FIG. 2A   FIG. 2B   FIG. 2C   FIG. 2D

FLOWCHART – PROCESSOR 4

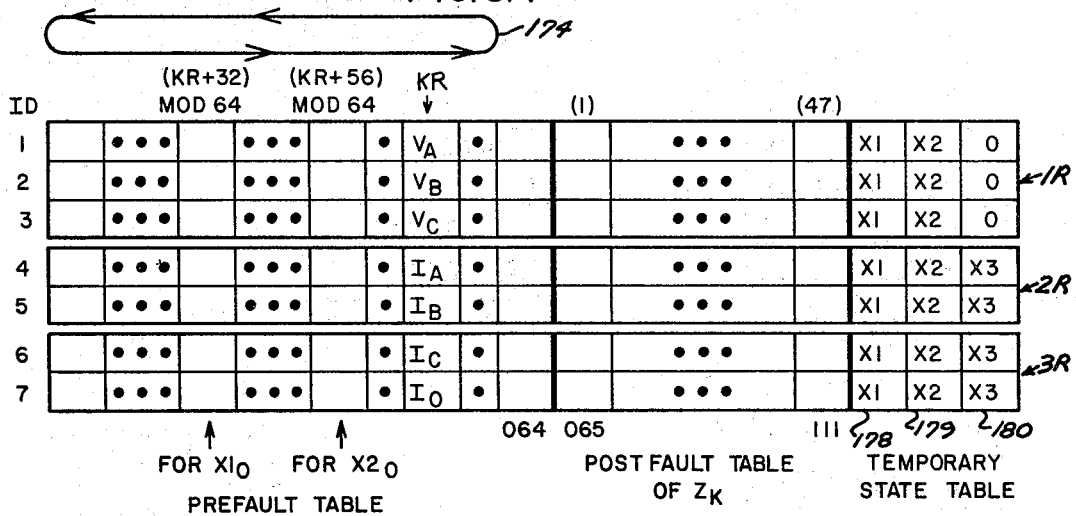
FIG. 3A
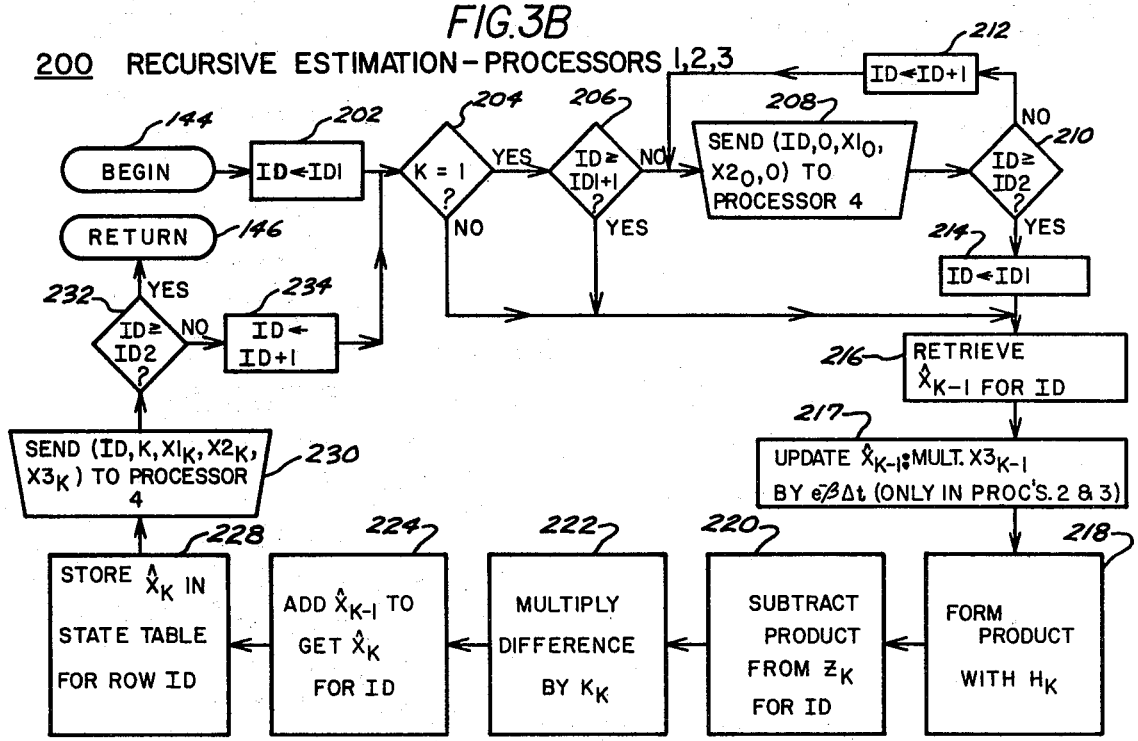
FIG. 3B
FIG. 3C
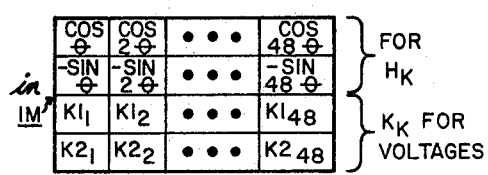
FIG. 3D
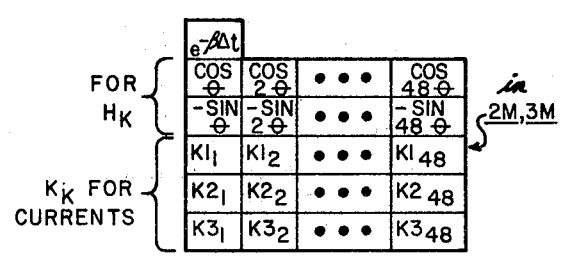

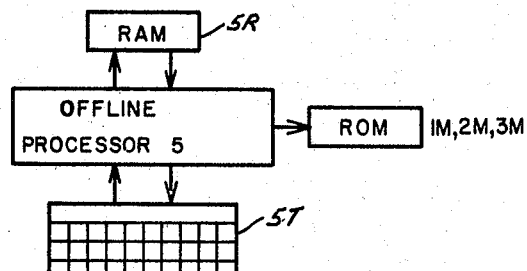
FIG.4A
COMPREHENSIVE STATE TABLE
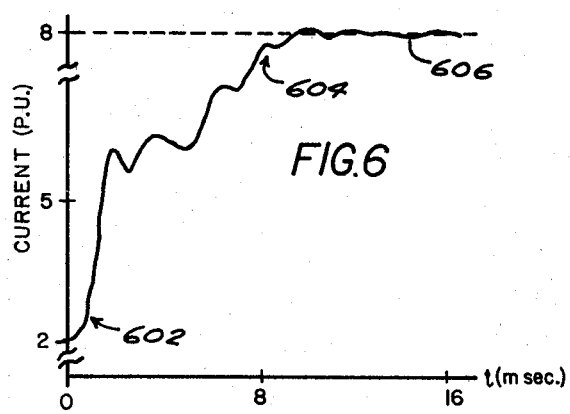
FIG.6
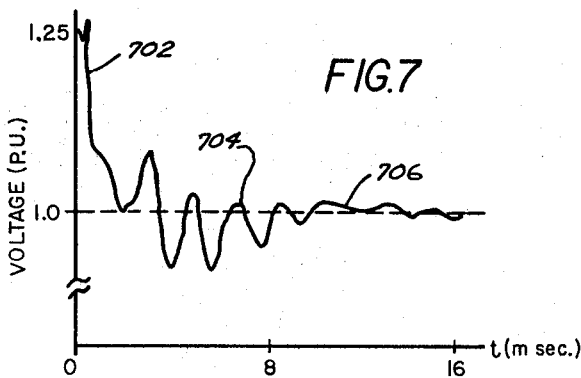
FIG.7
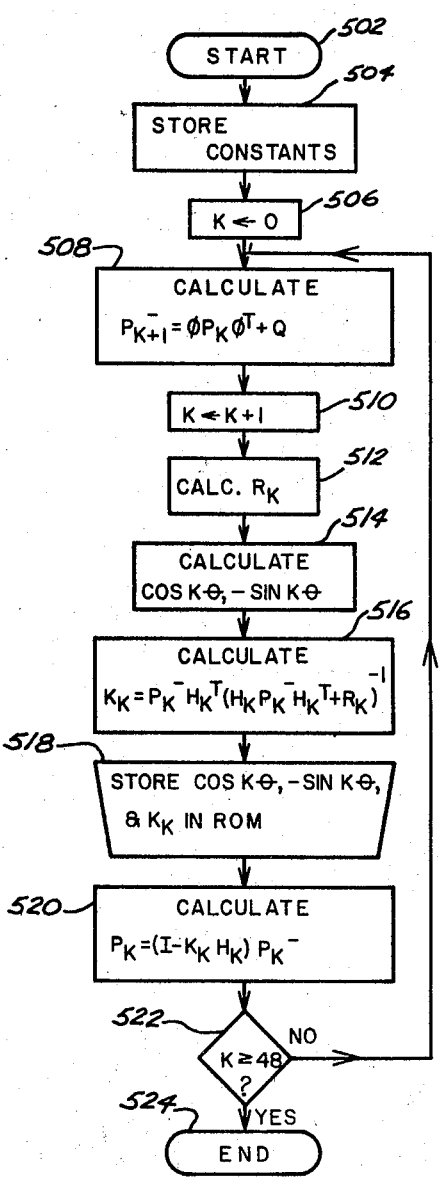
FIG.5
FIG.5A

RECURSIVE ESTIMATION IN DIGITAL DISTANCE RELAYING SYSTEM

BACKGROUND OF THE INVENTION

The present invention relates to the field of digital distance relaying for protecting an AC electric power transmission line system from faults. More specifically, the present invention relates to methods and systems for digital distance relaying involving automatically and recursively estimating postfault electrical quantities so as to relay the fault in the very first postfault electrical AC cycle.

In the field of electrical power engineering, generating systems for producing the electric power are interconnected in a complex power grid by high voltage alternating current (AC) three-phase electric power transmission lines. Occasionally, a transmission line is faulted when a conductor wire breaks and falls to the ground or when conductors short-circuit together. The power grid is provided with circuit breakers for disconnecting a faulted section of transmission line. When properly controlled by a distance-relaying computer, the faulted section, and only that section, should be swiftly disconnected so as to avoid unnecessary interruptions of service to electric power consumers and prevent a power blackout from extending over an unnecessarily large geographic region.

Electric power systems increasingly employ more expensive, higher capacity generation and transmission equipment involving increasingly higher voltages and currents. This trend in the technology is putting pressure on the art of digital distance relaying to relay the fault as early as possible in the first AC cycle after the inception of the fault. Unfortunately, swiftness in relaying a fault has proven to be a priority which competes with the goal of accurately and confidently identifying which transmission line section is the faulted section. A need is evident for a new relaying approach to provide a greater swiftness of relaying with the same accuracy of identification.

Heretofore, line currents and voltages from the three phases of a transmission line have been successively sampled and the inception of a fault has been detected by noting unusual departure from the expected values. After the fault occurs, postfault voltage and current samples have been taken, but these are observed to be corrupted by noise and transient behavior in the first postfault cycle which has limited the speed with which the steady-state sinusoidal waveform can be identified, from which accurate impedance calculations can be made. The sooner that accurate impedance calculations can be made, the sooner the faulted line section can be accurately identified.

SUMMARY OF THE INVENTION

The present invention recognizes that the method of determining the steady-state postfault voltage and current sinusoids should begin using postfault data as soon as the first sample becomes available. Moreover, the data used to represent observation of the postfault waveform should not be diluted with prefault samples such as are sometimes suggested for filling out a "window" when a prior art Fourier Transform technique is employed. In addition, the estimation should keep up with the rate of reception of sampling data so as to permit an updated estimation to be made between successive postfault samples.

Accordingly, the present invention provides methods and apparatus which respond to each postfault sample as it arrives and recursively electronically estimate a waveform including the desired steady-state sinusoids before the next sample arrives for that voltage or current to be estimated. The methods involve a powerful state variable approach which has no "window" length requirements. The recursive nature of the methods permits an updated estimate to be made utilizing the single latest sample of data and the previous estimate, thereby utilizing all of the information in all previous postfault samples without having to repeat the calculations that have been performed on all of the previous postfault samples. Thus, the recursive feature makes very swift relaying possible, and at the same time presents an easily manageable computer burden to the system employing it.

In the present invention, the line voltage and current waveforms are successively sampled and the inception of a fault, when it occurs, is detected by an appropriate known method, such as noting any sudden departures from the usual voltages and current. After the fault occurs, postfault voltage and current samples continue to arrive successively, and determination of the faulted line impedance on the basis of steady-state postfault sinusoidal voltage and current information is required. The steady-state would be available several cycles after the fault after the noise transient has decayed, but since the steady-state information is needed during the very first cycle it must be estimated.

In the invention each line-to-neutral voltage is required as a noisy sinusoid having known statistics and definable by at least two state variables. For example, a sinuosoid can be defined in terms of two amplitudes of a cosine and sine component respectively, or an amplitude and a phase angle of a cosine, hence the requirement of at least two state variables. Each of the voltage state variables (e.g. two amplitudes in quadrature) are recursively estimated after each voltage sample and before the next sample of the respective voltage arrives.

In the invention each phase current, or line current, is regarded as having at least three state variables, such as being defined in terms of two quadrature amplitudes and a decaying exponential waveform variable with known statistics. In this manner the methods are made sufficiently powerful to isolate the steady-state current sinusoids by recursive estimation after each current sample and before the next sample of the respective current arrives.

During the interval between samples the invention classifies the fault and determines whether the postfault line impedance can be and is determined with sufficient certainty in a prescribed danger zone so that the circuit breaker for the line section with which the system is associated can be tripped.

In the preferred embodiment described in detail hereinbelow, the relay will make a trip decision in as few as 3 milliseconds in a clear case and in most cases will trip in 9 milliseconds or less if the fault is in the zone. The computer burden in sufficiently light that the relaying is performed by a system including a few inexpensive microprocessors.

In a further feature of the invention, the methods employed are compatible with automated calculation according to a statistical estimation procedure in a mathematical field known as Kalman Filtering (also shown as recursive least-squares filtering and recursive minimum mean-square error filtering) for estimating the steady-state sinusoidal components of each line voltage and current in the presence of the noise and transient corruption. In application to the digital distance relaying art, it has been discovered in the present invention that the rather complex Kalman Filter calculation can be separated into offline (a priori calculations) and real-time (on-line) parts. Because the data arrives in discrete samples, discrete (as distinguished from continuous-variable) Kalman Filtering is employed in the disclosed preferred embodiment. Certain relatively complex equations can be solved or computed off-line and the values derived therefrom (Kalman Gain vectors) can be prestored corresponding to the respective postfault samples. Then in the on-line calculations only one equation need be computed for each sample of each voltage or current. The Kalman Filter estimation procedure is thus adapted in the preferred embodiment in the practice of the invention with remarkably low computing burden—six multiplications and six additions for the three-state current estimation. The amplitude states in quadrature correspond to the real and imaginary parts of the steady-state voltage and current postfault phasors. As a result, this approach to the state variable estimation is advantageously compatible with the complex division of voltage by current in determining the complex number postfault impedance, providing a further satisfactory feature relative to light computer burden.

The invention is applicable to estimation of steady-state postfault components from a single sampling location on a transmission line segment. In addition, the field of application also includes estimation of steady-state postfault components from multiple sampling locations, as in relaying apparatus for very long transmission lines.

BRIEF DESCRIPTION OF THE DRAWING

FIG. 1 is an electrical block diagram of the digital distance relaying and fault locator system in a preferred embodiment according to the invention.

FIG. 1A is an electrical diagram illustrating the voltage and current transmission line electrical quantities measured in the three-phase system of FIG. 1.

FIG. 2A is an electrical current-versus-time graph of an example of prefault and postfault current in a faulted phase of the transmission line of FIG. 1.

FIG. 2B is a current-versus-time graph of the cosine wt component of postfault current having an amplitude corresponding to the magnitude of a state variable X1.

FIG. 2C is a current-versus-time graph of the negative sine wt component of postfault current having an amplitude corresponding to the magnitude of a state variable X2.

FIG. 2D is the current-versus-time graph of the transient component of postfault current wherein the transient is regarded partly as a decaying-exponential current corresponding to the state variable X3, the rest of the transient being regarded as noise having a decaying-exponential variance.

FIG. 3A is a diagram illustrating the Prefault Table, the Postfault Table, and the Temporary State Table, each table being stored in respective parts in random-access memories (RAMs) 1R, 2R, and 3R in the system of FIG. 1.

FIG. 3B is a flowchart for illustrating in greater detail the recursive estimation methods of operation in FIG. 3 in each of Processors 1,2, and 3 of FIG. 1. A Kalman Filter estimation procedure is shown.

FIG. 3C is a diagram illustrating a Kalman Filter number table prestored in read-only-memory (ROM) 1M of Processor 1 of FIG. 1 for Kalman Filtering of the phase voltage samples.

FIG. 3D is a diagram illustrating a Kalman Filter number table identically prestored in each of the read-only-memories (ROMs) 2M and 3M of Processors 2 and 3 of FIG. 1 for Kalman Filtering of the phase current and zero-sequence current samples.

FIG. 4A is a diagram illustrating the Comprehensive State Table being stored in random-access memory (RAM) 4R in the system of FIG. 1.

FIG. 5 is a block diagram of an offline computer system for generating the Kalman Filter number tables of FIGS. 3C and 3D and prestoring them in ROMs 1M,2M and 3M of the system of FIG. 1.

FIG. 5A is a flowchart for illustrating the methods of operation implemented in the offline computer system of FIG. 5.

FIG. 6 is an electrical current-versus-time diagram illustrating the recursive estimation method in a preferred embodiment of the invention converging on a current phase current value in half of the first postfault cycle.

FIG. 7 is an electrical voltage-versus-time diagram illustrating the recursive estimation method in a preferred embodiment of the invention converging on a correct phase voltage value in half of the first postfault cycle.

DETAILED DESCRIPTION OF THE DRAWING

Figure 4:
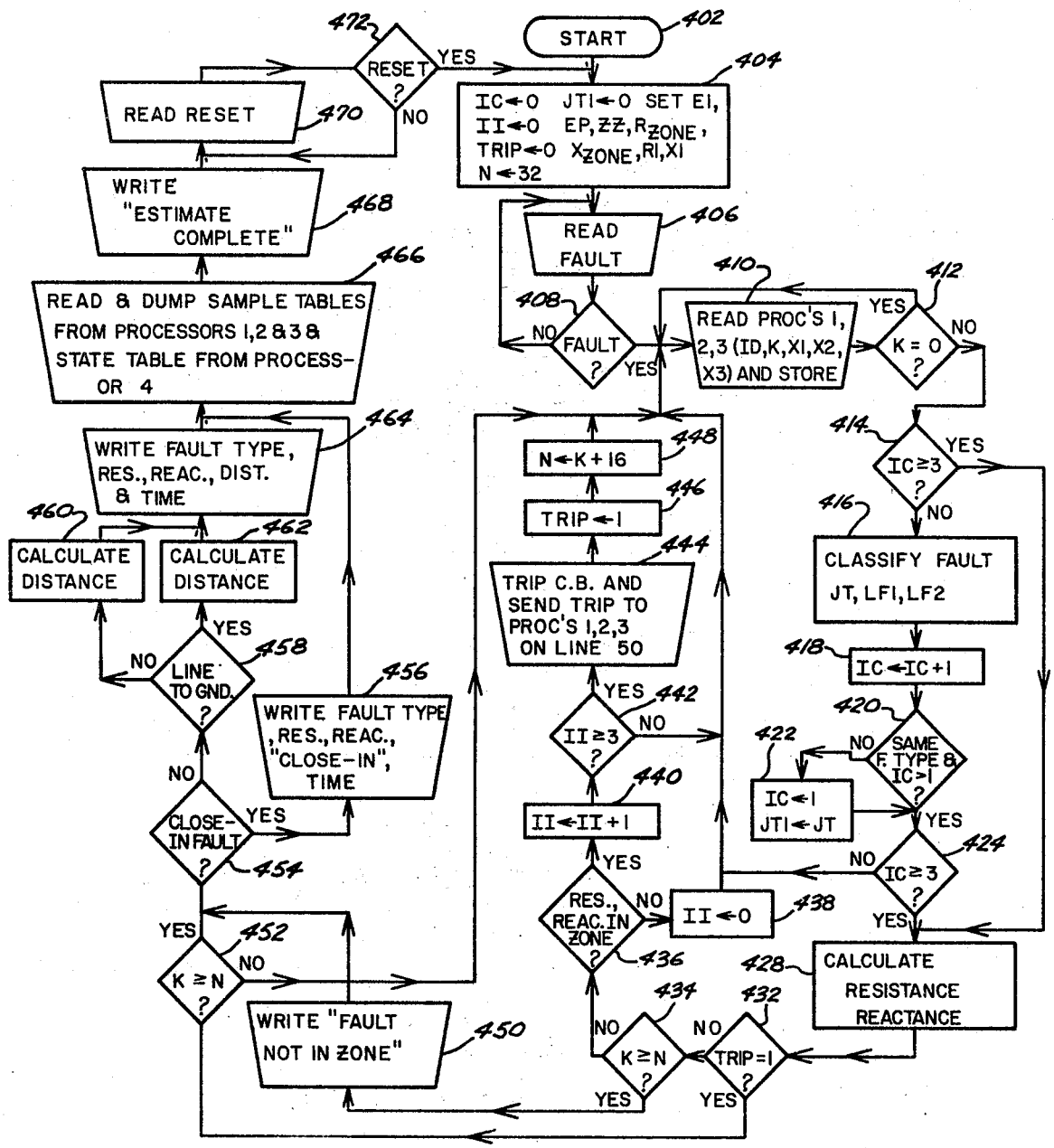
FIG. 4 is a flowchart for illustrating the methods of operation implemented in Processor 4 of FIG. 1.

In FIG. 1 a power grid includes 3-phase transmission lines $L_1$ and $L_2$ joined to 3-phase transmission lines $L_3$ and $L_4$ by 3-phase transmission line 24. Line 24 has three conductors 24A, 24B, and 24C. Line 24 is protected by the inventive digital relay and fault locator 10.

Network 12 includes all electrical equipment to the left of transformer 16 in FIG. 1 as well as the lines $L_1$ and $L_2$; and network 12 is regarded as an equivalent circuit including an equivalent generator 14. Network 12 delivers electric power to transformer 16, line 24, and network 26. Network 26, in turn, includes all electrical equipment to the right of line 24 on FIG. 1 as well as the lines $L_3$ and $L_4$; and network 26 is regarded as an equivalent circuit including an equivalent load impedance, not shown.

When a fault F occurs at a distance D along line 24, line 24 must be swiftly disconnected from network 12 by means of 3-phase circuit breaker (C.B.) 22. Current transformers (CTs) 18 and potential (voltage) transformers (PTs) 20 are provided for current and voltage monitoring purposes respectively on line 24 behind C.B. 22.

FIG. 1A illustrates the electrical voltages and currents of interest on 3-phase line 24 as provided by the CTs 18 and PTs 20. Conductors 24A, 24B, and 24C respectively carry phase currents $I_A$, $I_B$, and $I_C$ have respective potentials, or voltages, $V_A$, $V_B$, and $V_C$ with respect to neutral N of the 3-phase system. A zero-sequence current $I_o$, which is one-third of the sum of the phase currents, is suggested on FIG. 1A. In normal operation the three phase voltages are sinusoids, sine waves, which are equal in amplitude and 120 degrees out of phase each to each. Similarly, the phase currents are normally also sinusoids of equal amplitude and 120 degrees out of phase each to each, and the zero-sequence current is negligible or zero.

The CTs 18 provide analog waveforms corresponding to currents $I_C$, $I_o$, $I_A$, and $I_B$ at terminal pairs 28, 30, 32, and 34, respectively. The PTs 20 provide analog waveforms corresponding to voltages $V_A$, $V_B$, and $V_C$ at terminal pairs 36, 38, and 40 respectively. The provisions for the CTs 18 and the PTs 20 are of a standard type ordinarily available at the stationhouse and familiar in the art.

Although faults, which are electrical accidents in the line 24, are rare, several types of faults can occur. Among faults, the most commonly occurring type is the single-line-to-ground fault F suggested in FIG. 1. Conductor 24C has snapped and fallen to the ground 25, or an insulator has electrically failed. A fault is a form of short circuit, causing line voltage to be more or less loaded down and line current to dramatically rise in steady-state amplitude within a few cycles. Less-common faults (not shown, but contemplated in the inventive relaying system) are line-to-line faults (such as a line 24C to 24B short circuit, line-to-line-to ground faults, and 3-phase faults (all lines shorted together).

When the line 24 is faulted, at least one of the line currents, suggested as sinusoidal prefault wave 80 of FIG. 2A, is substantially disrupted in shape as at part 79 of postfault wave 78. Samples, such as 76 are taken of the postfault wave 78 as sampling 73 of prefault wave 80 continues after the onset or inception 75 of fault F. Postfault wave 78 assumes a sinusoidal shape of greater amplitude and, in general, different phase only much later, as after wave part 81.

The task of relaying a faulted transmission line 24 is to send a TRIP signal on line 50 to C.B. 22 of FIG. 1 very quickly, and preferably in about half of an AC cycle (8 milliseconds at 60 Hz.) or less, so as to protect expensive equipment in network 12 and transformer 16. The fault must be relayed so soon only if the fault has occurred on the transmission line 24 and not in lines $L_1$, $L_2$, $L_3$, or $L_4$ which are separate zones or sections which are to be separately protected by their own relaying equipment, not shown. The information needed to make the determination of whether or not to trip the C.B. 22 is contained in the steady-state sinusoidal shape of the postfault waveforms which the postfault voltages $V_A$, $V_B$, $V_C$ and currents $I_A$, $I_B$, $I_C$, and $I_o$ assume after a few cycles. Unfortunately, the waveforms are disrupted by noise and transients during the first cycle after the fault. The inventive system is able to confidently predict according to the inventive method the steady-state components of the postfault waveforms early in the very first postfault cycle, however, and thus determines whether a fault must be cleared by tripping C.B. 22 immediately.

In FIG. 1 the analog inputs for $I_C$ and $I_o$; $I_A$ and $I_B$; and for $V_A$, $V_B$, and $V_C$ are respectively provided to the sample-and-hold analog-to-digital conversion units 42, 44, and 46 as shown. 8 MegaHertz clock multivibrator 41 is fed to digital frequency divider circuit 43 which provides sampling pulses of very short duty cycle at 1920 Hertz (a sampling rate of 32 samples per cycle at 60 Hertz) to simultaneously cause sampling of every analog input $I_C$, $I_o$, $I_A$, $I_B$, $V_A$, $V_B$, and $V_C$ every 520 milliseconds at 60 Hz. Unit 42 suitably has a pair of sample-and-hold circuits for simultaneously sampling $I_C$ and $I_o$ followed by an analog-to-digital converter circuit for making the conversion of the samples to digital form and multiplexing onto bus 52 to Processor 3. Similarly, unit 44 provides its $I_A$ and $I_B$ samples onto bus 54 to Processor 2. Unit 46 suitably has three sample-and-hold circuits for simultaneously sampling $V_A$, $V_B$, and $V_C$ followed by an analog-to-digital converter circuit for making the conversion of the voltage samples to digital form and multiplexing the triplet of samples onto bus 56 to Processor 1. It is to be understood that in this embodiment all samples of the electrical quantities, 7 of them, are taken simultaneously, and the sampling is repeated at the rate of 32 samples per cycle under the sole control of the frequency divider 43 output and without any control being exercised by any of the Processors in the system, as to the instant of sampling. Also, in this embodiment the sampling rate is held at 1920 Hz. regardless of whether the actual prefault system frequency has departed slightly from the nominal 60 Hz.

Precessors 1, 2, and 3 are called Sampling Processors in the present work because they parallel-process the digital sampling data provided to them on buses 52, 54, and 56. When a fault occurs Processor 1 provides real-time estimations of the state variables of the postfault waveforms of $V_A$, $V_B$, and $V_C$ along bus 64 to Processor 4. Similarly, Processor 2 provides real-time estimations of the state variables of the postfault waveforms of $I_A$ and $I_B$ along bus 65 to Processor 4, and Processor 3 provides its real-time estimations of the state variables of the postfault waveforms of $I_C$ and $I_o$ along bus 66 to Processor 4. Each Sampling Processor 1, 2, and 3 is respectively provided with a read-only-memory (ROM) 1M, 2M, and 3M, and a random-access memory (RAM) 1R, 2R, and 3R. Buffer registers 67, 68, and 69 are provided as needed in order to permit orderly, but rapid, access by Processor 4 on busses 70, 71, and 72 to the information coming from the Sampling Processors on buses 64, 65, and 66 respectively. Processor 4 is called the Supervisory Processor herein because it supervises the interpretation of the state variable estimates, impedance calculations and fault classification, tripping of C.B. 22, and fault locator distance calculation, for example. Processor 4 is provided with its ROM 4M and RAM 4R, a keyboard terminal 8 and a documentation printer 9.

Each Processor 1, 2, 3, and 4 is provided with a clock input C so that each is run at the 8 MHz. rate set by clock 41.

Processors 2 and 3 monitor buses 52 and 54 for inception of a fault F. When either Processor 2 or 3 senses the presence of a fault, a signal is provided by one or the other or both along line 60 or 62 to OR-gate 63, which in turn provides a fault signal along line 58 to all the Processors 1, 2, 3, and 4, so that postfault processing can commence.

When and if it is determined the C.B. 22 must be tripped to clear a Zone 1 fault, or fault on transmission line 24, Processor 4 communicates a TRIP signal along line 50 to C.B. 22 and to Sampling Processors 1, 2, and 3.

When the fault F has been cleared and circuit breaker 22 is reset, a reset signal provided in standard manner from C.B. 22 is conducted along reset line 48 to all Processors 1, 2, 3, and 4.

Processors 1, 2, and 3 continually monitor and keep tables of the most recent two cycles of prefault data in their RAMs 1R, 2R, and 3R. They are suitably, but not necessarily, dedicated microprocessors in view of their monitoring function. ROMs 1M, 2M, and 3M and RAMs 1R, 2R, and 3R are suitably 4K word memories with 16 bits per word, although the skilled worker should in any event provide the memory capacity which the system being designed requires.

Processor 4 is suitably a stationhouse general purpose computer or minicomputer or microcomputer. It is contemplated that Processor 4 need only be active in the system in the postfault period. Faults being relatively infrequent, Processor 4 need not be a dedicated processor, and for economic efficiency should be being used for other purposes most of the time. However, when a fault signal appears on line 58, Processor 4 must be a computer which can be immediately interrupted at the highest level of priority to permit postfault processing. The ROM 4M and RAM 4R of Processor 4 should suitably be of at least 6K word capacity with 16 bits per word, and in any event of sufficient memory capacity which the system being designed requires.

Processors 1, 2, 3, and 4 are preferably of such type as to be able to do arithmetic on 16 bit words, to accomplish a division or multiplication of two 16 bit words in less than 10 microseconds, and an addition or subtraction of two 16 bit words in less than 2 microseconds. A commercially available microprocessor identified as the MC68000 is one suitable type.

It is recognized that the engineering of computer systems is presently such that the person skilled in the art is sophisticated in making the appropriate arrangements to accomplish desired transfers of information and calculations in such systems, and the detailed description herein is provided so as to detail the operations to be performed so that the skilled worker can prepare the system accordingly.

Each of the voltages $V_A$, $V_B$, $V_C$ and the currents $I_A$, $I_B$, $I_C$ and $I_o$ is regarded for the present purposes as having a cosine component 82, as shown in FIG. 2B, and a negative sine component 84, as shown in FIG. 2C. The state variable X1 and X2 for each of the voltages and currents are real number multipliers of the components 82 and 84 respectively. State variables X1 and X2 are estimated and refined in estimate, successively beginning with the inception of fault F and upon receipt of each successive postfault sample, indexed with a whole number k.

The magnitude of state variable X1 is the amplitude of the cosine component 82, and the magnitude of X2 is the amplitude of the negative sine component 84. X1 and X2 are each able to independently have any real number value being positive, negative, or zero. From a statistical point of view, each state variable X1 and X2 is regarded as an independent random variable with a Gaussian statistical distribution having zero mean.

The choice of components 82 and 84 as cosine and negative sine advantageously permits state variables X1 and X2 to also be identical to the real and imaginary parts of the steady-state complex number phasor representation of each voltage and current. The phasor representation, it will be appreciated, is directly applicable in making postfault impedance and distance D calculations.

It is readily demonstrated that the state variables X1 and X2 are the real and imaginary parts of the corresponding phasor when components 82 and 84 are the cosine and negative sine respectively. Let the phasor be the counterclockwise phase $Ae^{j\phi}$. The real and imaginary parts of the phasor are given by the identity $$Ae^{j\phi} = A \cos \phi + jA \sin \phi \qquad (1)$$

where A is the amplitude of the voltage or current at hand, $\phi$ is its phase angle, and j is the square root of $-1$.

The function of time to which the phasor corresponds is by convention taken as the real part of the phasor product with $e^{+jwt}$, where t is time in seconds and w is radian frequency (377 radians per second at 60 Hz.). Accordingly, $$Re(Ae^{j\phi} \cdot e^{jwt}) = Re(Ae^{j(wt+\phi)}) = A \cos(wt+\phi) \qquad (2)$$

When the just-stated real part is expanded by the trigonometric identity for the cosine of the sum of two angles, the result is $$A \cos(wt+\phi) = (A \cos \phi) \cos wt + (A \sin \phi)(-\sin wt) \qquad (3)$$

The state variable X1 is by definition the multiplier $A \cos \phi$ of the $\cos wt$ component of the time function; and state variable X2 is similarly by definition the multiplier $A \sin \phi$ of the negative sine component of the time function of Equation (3). It is evident therefore, by comparison of Equation (3) with Equation (1) that X1 and X2 are the real and imaginary parts of the phasor as well.

For each of the currents $I_A$, $I_B$, $I_C$, and $I_o$ a third component 86, as shown in FIG. 2D, is recognized. FIG. 2D illustrates that in respect of the currents a substantial transient 86 is observed which appears to be a noisy decaying exponential function of time, in addition to the quadrature sinusoidal components 82 and 84 of FIGS. 2B and 2C. A state variable X3, which as shown in FIG. 2D is a decaying exponential function of time, is selected in the present work. The initial value of this decaying exponential function to be estimated can be any positive, negative, or zero real number, illustrated as positive in FIG. 2D. The departure of current transient 86 from state variable X3 (curve 92) is noisily large at initial portion 88 and becomes noisily small later at latter portion 90. The departure is regarded as noise having an exponentially decaying variance.

Processor 1 estimates recursively the state variables X1 and X2 for the voltages, and in this preferred embodiment estimates the first two state variables without having to take any third state variable of necessity into account. Processors 2 and 3 estimate the state variables X1 and X2 for the four currents ($I_A$ and $I_B$ in Processor 2, $I_C$ and $I_o$ in Processor 3) and the third state variable X3 as well. In this preferred embodiment the inclusion of the third state variable in the estimates for the currents has been found to be advantageously significant in improving the speed of convergence of the estimates of X1 and X2 to the correct postfault values without having to take any additional state variable of necessity into account.

The choice of 2 state variables for the voltages and 3 state variables for the currents in this preferred embodiment is believed to provide an advantageous speed of convergence to correct values on the one hand, and an acceptably light computer burden on the other hand. Choice of additional state variables in a variety of recursive estimation procedures are contemplated in other embodiments of the invention notwithstanding.

The choice of sampling rate at 32 samples per cycle (sample every 520 microseconds at 60 Hz.) in this preferred embodiment is believed to provide enough samples in a relatively short time to permit statistically confident estimates quickly, and at the same time is sufficiently slow to offer an acceptably light computer burden and permit the use of very inexpensive microprocessor hardware in small numbers. Choices of other sampling rates are compatible with the practice of the invention. An interesting feature of the estimation procedure disclosed herein is that while sampling rates such as 16, 32, 64, being numerically powers of 2 are suitable candidates, rates at least 32 being preferred, the sampling rate is not constrained to be a power of 2 as a matter of principle. Accordingly, where the skilled worker finds it useful to employ another sampling rate, e.g. to accommodate the speed of available computer hardware, this may be accomplished by recalculating the Kalman Filter number tables and appropriately modifying each operation or flowchart step which is based on the assumed sample rate of 32 herein.

Figure 3:
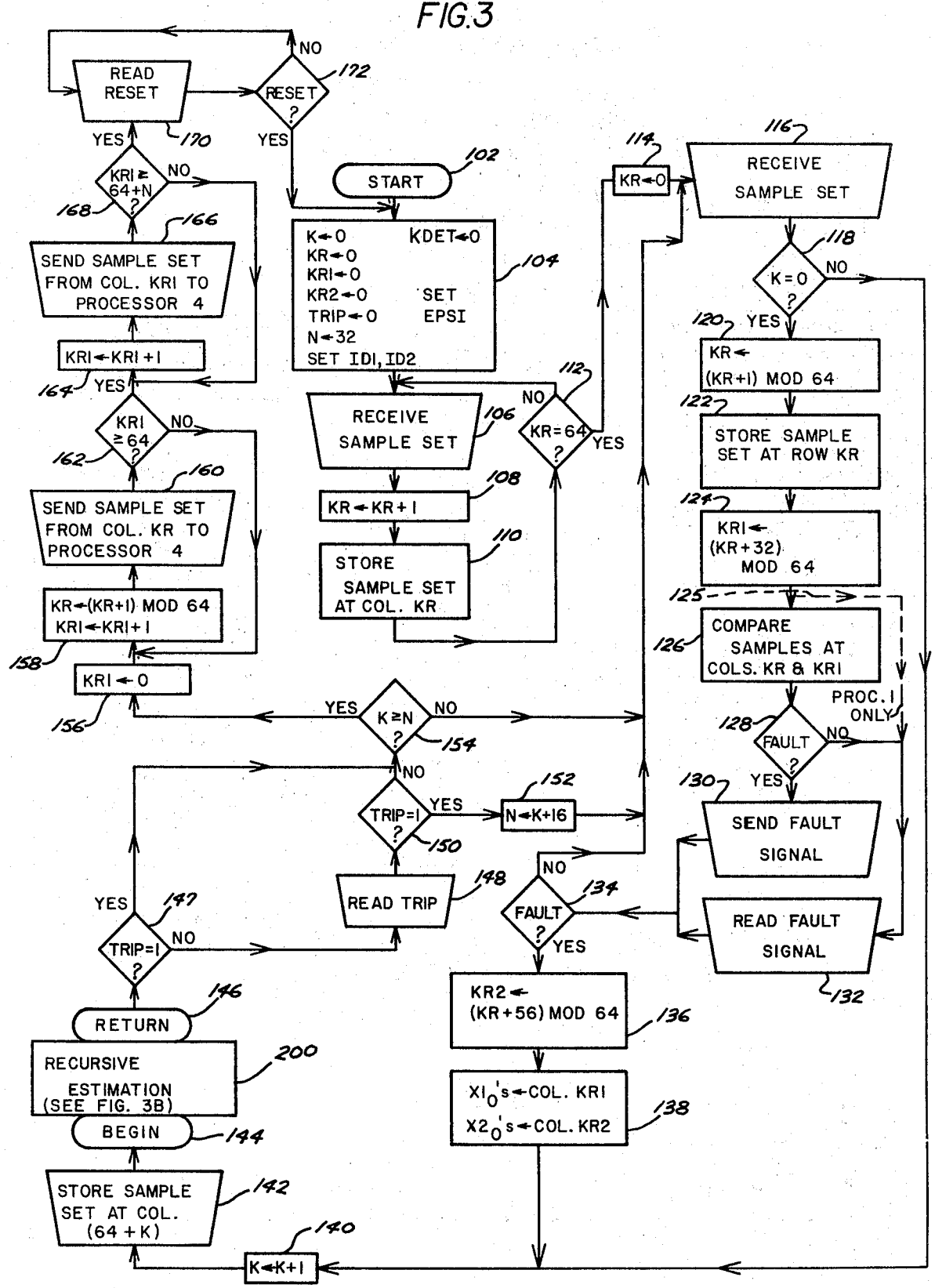
FIG. 3 is a flowchart for illustrating the methods of operation implemented in each of Processors 1, 2, and 3 of FIG. 1.

In FIG. 3, the operation of the Sampling Processors 1,2, and 3 is illustrated by a flowchart of the computer programming to be used in each.

The operations of each Processor 1, 2 and 3 begin at START 102 and proceed to step 104. At step 104 certain variables are initialized and constants stored. Set to zero are the initial values of sampling index k, Prefault Table column pointers KR, KR1, and KR2, the TRIP flag and the fault detection flag KDET. The maximum number N of postfault samples is initially estimated at 32, i.e. one full cycle of samples at 32 samples per cycle.

The maximum tolerable prefault current change between samples exactly one cycle apart, EPSI (dimensions in amperes, is set to a fraction, such as 0.05, of the maximum expected amplitude of a phase current on the line.

Also at step 104 certain identification constants ID1 and ID2 are set to values respective to the Processors 1, 2, and 3 in the manner now explained. The electrical quantities $V_A$, $V_B$, $V_C$, $I_A$, $I_B$, $I_C$, and $I_o$ are identified by the integers 1,2,3,4,5,6,7 respectively so that each Processor 1, 2, 3, and 4 can identify which samples and state variables estimates correspond with which electrical quantity. Thus, Processor 1 for the voltages processes the electrical quantities with identification numbers 1, 2, and 3—that is, $V_A$, $V_B$, and $V_C$. Processor 2 processes the electrical quantities with identification numbers 4 and 5—that is, $I_A$ and $I_B$. Processor 3 processes the electrical quantities with identification numbers 6 and 7—that is, $I_C$ and $I_o$.

The identification constants ID1 and ID2 are the lower and upper identification numbers of the set of electrical quantities which are to be processed in a given Sampling Processor. In Processor 1, ID1 is set to 1 and ID2 is set to 3 at step 104, meaning that all electrical quantities from 1 to 3 will be processed. In Processor 2, ID1 is set to 4 and ID2 is set to 5 at step 104. In Processor 3, ID1 is set to 6 and ID2 is set to 7 in step 104.

Next the Prefault Table for each Processor 1, 2, and 3 is filled with 2 cycles of samples ($2 \times 32 = 64$) at steps 106,108,110, 112 in FIG. 3. As illustrated in FIG. 3A, Processors 1, 2, and 3 have respective RAMs 1R, 2R, and 3R which include rows of data corresponding to the identification numbers 1,2,3 for RAM 1R, identification numbers 4 and 5 for RAM 2R, and identification numbers 6 and 7 for RAM 3R. The first 64 columns 001 through 064 of the rows in the RAMs are called the Prefault Table.

Taking Processor 1 as an example, a set of simultaneous samples of $V_A$, $V_B$, and $V_C$ are received on bus 56 by Processor 1 from A/D unit 46 at step 106. At step 108, the column pointer KR is incremented by 1. At step 110, the sample set is stored at the column to which the column pointer KR has been incremented. The sample of each of $V_A$, $V_B$, and $V_C$ is stored at row 1, 2, and 3, all in column KR, respectively, corresponding to the identification number of each.

At step 112, KR is tested to determine if all 64 columns have been filled with sample data, and if not, the program returns to receive a new sample set at step 106, increment the pointer KR at step 108, and store the sample set in the next column until all 64 columns have been filled. Then the program sets the column pointer KR to zero at step 114.

In Processor 2, the values of $I_A$ and $I_B$ are stored in RAM 2R at column KR in two rows identified as rows 4 and 5 respectively. In Processor 3, the values of $I_C$ and $I_o$ are stored at RAM 3R in column KR in two rows identified as rows 6 and 7 respectively on FIG. 3A. It it is to be understood that discussion of rows and columns and tables is provided herein as a guide to skilled worker in laying out memory either directly or by means of a compiler program, and that the physical locations in memories are not necessarily in physically geometric rectangular tables as shown.

Once the Prefault Table has been filled with the first 64 columns bearing the first two cycles of data samples, the program maintains the Prefault Table in a periodic manner as suggested by loop 174, writing new data in over 64 sample sets previous, so that only the most recent 64 sample sets are stored in the Prefault Table at any time. This maintaining operation occurs in steps 116,118,120 and 122 of FIG. 3.

At step 116 a new set of simultaneous samples ($V_A$, $V_B$, and $V_C$ in Processor 1; $I_A$ and $I_B$ in Processor 2; and $I_C$ and $I_o$ in Processor 3) is received in the same manner from A/D units 42, 44, and 46 on buses 52, 54, and 56 respectively, as in step 106. At step 118 the postfault sample index k is tested to determine whether it is still zero, that is, whether no fault has yet been detected. If the postfault sample index k is still zero, then at step 120 the program sets column pointer KR at the previous value of KR incremented by 1, modulo 64. In other words, KR is incremented by 1, and if KR exceeds 64, the sum is reduced by the number 64. In this way KR does with succeeding samples take on the successive values 1,2,3, ... 63,64,1,2,3, ... 63,64,1,2,3, ... in the periodic manner contemplated and suggested by loop 174 in FIG. 3A. Then at step 122 of FIG. 3., the latest sample set is stored in column KR in the Prefault Table.

Next at step 124 Processors 1, 2, and 3 each compute the column corresponding to the sample set exactly one cycle at 60 Hz. earlier (32 samples earlier). In order to find the column 32 sample sets earlier, the program sets a column pointer KR1 equal to the latest value of the column pointer KR plus 32, modulo 64. For example, if KR is 2, the values of samples 32 samples earlier are found at column KR1=34. If KR is 32, KR1 is 64. If KR is 33, KR1 is 1. If KR is 50, KR1 is $50+32-64=18$.

After step 124, the voltage Processor 1 omits steps 126,128, and 130 and proceeds along dashed line 125 directly to step 132 to look for a fault signal due to the fault detection procedure of Processors 2 and 3 in steps 126, 128, and 130. In other words, only Processor 1 proceeds along line 125; and only Processors 2 and 3 execute steps 126, 128, 130.

Fault Detection:

Processors 2 and 3 monitor the current samples for the inception of a fault using steps 126, 128, and 130. At step 126 a comparison is made to determine whether any of the current samples have departed from their respective values one electrical 60 Hz. cycle earlier (32 samples earlier). This is accomplished by comparing the entries in the Prefault Table at columns KR and KR1 for the three line currents $I_A$, $I_B$ and $I_C$ and the zero-sequence current $I_o$. Any suitable fault detection routine is used here, and one approach herein disclosed is that of comparing the maximum tolerable current change value EPSI with the absolute value of the difference in each current sample from the value 32 sample sets previous. If the difference magnitude exceeds EPSI for any of the currents, then a fault is detected and a fault detection variable KDET is set to 1. In symbols, Processor 2 implements at step 126:

IF ABS($I_A$(KR)−$I_A$(KR1)) GT EPSI THEN KDET=1

IF ABS($I_B$(KR)−$I_B$(KR1)) GT EPSI THEN KDET=1

Processor 3 implements at step 126:

IF ABS($I_C$(KR)−$I_C$(KR1)) GT EPSI THEN KDET=1

IF ABS($I_o$(KR)−$I_o$(KR1)) GT EPSI THEN KDET=1

At step 128 in Processors 2 and 3, the fault detection flag KDET is tested. If KDET is 1 then a fault signal is sent at step 130 to alert all other Processors 1, 2, 3, and 4 in the system. For instance, in FIG. 1 if Processor 2 KDET is 1, a 1 is sent along line 60 to OR-gate 63, which in turn sends a fault signal along line 58 to the fault inputs of Processors 1, 2, 3, and 4. If Processor 3 KDET is 1, a 1 is sent along line 62 to OR-gate 63 which sends a fault signal along line 58.

It will be noted that using both Processors 2 and 3 for fault detection provides a degree of advantageous redundancy in the system so that in many cases both Processors 2 and 3 will detect the fault at the same time.

If the Processor 1, 2, or 3 has not detected a fault at step 128 (KDET is not 1), then the program proceeds to step 132 where a check for a fault signal on line 58 of FIG. 1 is made by reading for the fault signal. If there is a fault signal on line 58, KDET is now set to 1 and a fault is detected at step 134.

If no fault indication has appeared at step 134, each Processor 1, 2, and 3 returns to step 116 to receive the next incoming sample set and proceeds through Prefault Table maintenance and fault detection for each succeeding prefault sample set, until a fault occurs and is found at step 134.

It is preferable that each of the Processors 1, 2, and 3 will determine the existence of a fault by the time step 134 is executed, either by its own fault detection routine at 126 or by signalling from another one of the Sampling Processors. If, for instance, Processor 1 will otherwise reach step 132 too soon to read a fault signal for a given sample set, it is contemplated that the skilled worker will introduce sufficient waiting time in the Processor 1 operations in line 125, to detect the fault signal at step 132 in its processing of its set having the same index k.

Once a fault occurs and is detected and acted upon at step 134, the program proceeds to step 136, where in addition to the column pointer KR1 already computed, the program finds an additional column pointer value KR2. Pointer KR2 is useful together with KR1 in identifying the prefault data needed for use as initial state variable estimates in the Recursive Estimation 200 and Fault Classification (FIG. 4, step 416) discussed hereinbelow. KR2 is set to the column number of the column of samples which occurred a quarter cycle prior to the fault. KR2 is calculated as KR plus 56, modulo 64. For example, if KR is 3, KR2 is 59. If KR is 8, KR2 is 64. If KR is 9, KR2 is 1. If KR is 43, KR2 is 35. If KR is 64, KR2 is 56. In general, KR is added to 56 and if the sum exceeds 64, then 64 is subtracted from the sum to yield KR2.

The reasoning behind the selection of the values of KR1 and KR2 as being for sample sets a full cycle and a quarter cycle prior to the fault is now discussed. Since all the prefault voltages and currents are steady-state sinusoids their waveforms can be regarded as being defined respectively by the two state variables $X1_o$ and $X2_o$ in the time function $$X1_o \cos wt + X2_o (-\sin wt) \qquad (4)$$

The angle wt is defined to be zero at the inception of the fault. One cycle earlier, the value of the time function of Equation (4) for a given one of the seven electrical quantities is the sample in the column (KR1=(KR+32)$_{mod\ 64}$) for that electrical quantity which is precisely $X1_o$. One quarter cycle before the fault ($-\pi/2$), the first term of Equation (4) is zero and the time function is precisely equal to $X2_o$, corresponding to the sample in the column KR2=(KR+56)$_{mod\ 64}$ for the electrical quantity.

Accordingly, at step 138, the prefault state variables $X1_o$ and $X2_o$ are set for each voltage $V_A$, $V_B$, and $V_C$ in Processor 1, each current $I_A$ and $I_B$ in Processor 2, and each current $I_C$ and $I_o$ in Processor 3, to the corresponding sample value at column KR1 and KR2 respectively. As shown in FIG. 3A, column KR1 for finding $X1_o$ for each voltage or current is the column denominated (KR+32)$_{mod\ 64}$ and the column KR2 for finding $X2_o$ for each voltage or current is the column denominated (KR+56)$_{mod\ 64}$. For example, the state variable $X1_o$ for the cosine component of the prefault voltage $V_B$ is found at the row having identification number 2 in FIG. 3A, in RAM 1R, column KR1. As another example, the state variable $X2_o$ for the negative sine component of the prefault current $I_o$ is found at the row having identification number 7 in FIG. 3A, in RAM 3R, column KR2.

In preparation for the recursive estimation procedure 200, initial estimates of the state variables X1, X2, and X3 are made for each electrical quantity, i.e. each voltage or current. All the initial estimates of state variables could be set to zero, but it appears preferable to set X1 and X2 to the values of the prefault states $X1_o$ and $X2_o$ and leave X3 for currents as zero; and this approach is taken in the preferred embodiment.

Next, at step 140, the postfault sample index k is incremented by 1. Then at step 142 maintenance of the Postfault Table of FIG. 3A is performed by storing the latest sample set into the column numbered equal to the sum of 64 plus k. For example, the first postfault sample, k=1, is stored at Postfault Table column 065 in the row identifying the electrical voltage or current to which the sample corresponds. In contrast to the Prefault Table, the program will for a given fault F only fill up part or all of the Postfault Table once, which is only intended to hold no more than 47 columns of samples for the fault. There is no periodic modulo 64 overwriting involved in keeping the Postfault Table current, as is the case with the Prefault Table. The Prefault Table is being maintained for days, months, or years until a fault F occurs, but only then does the program begin to enter postfault sample data into the Postfault Table for $1\frac{1}{2}$ cycles or less. Once the Postfault Table is begun to be filled, however, the selection of rows is the same for the Prefault Table, i.e. the voltages are stored at rows 1,2, and 3 in RAM 1R, currents $I_A$ and $I_B$ in rows 4 and 5 in RAM 2R, and currents $I_C$ and $I_o$ in RAM 3R.

After maintenance of the Postfault Table, each Processor 1, 2, and 3 begins the swift recursive Kalman Filter estimation procedure 200 at BEGIN 144 and completes it at RETURN 146. The recursive estimation procedure 200 is described more fully in connection with FIG. 3B. Briefly, this procedure 200 first sends the prefault states $X1_o$ and $X2_o$ to Processor 4 for each electrical quantity. Next, state variable estimates are calculated, or updated or refine, for each of the postfault electrical quantities. The state variable estimates are stored in the Temporary State Table of FIG. 3A and transmitted to Processor 4 for use therein and storage in the Comprehensive State Table of FIG. 4A. Procedure 200 is carried out successively with the arrival of successive sample sets of postfault data.

After the recursive estimation procedure 200 is completed at RETURN 146, the program at step 147 checks the value of the TRIP flag variable. If Processor 4 has not sent a TRIP signal along line 50 of FIG. 1 at any time in the past, TRIP is zero and the program proceeds to read line 50 at step 148. If line 50 is set to an electrical 1 "one", then a this means that Processor 4 is just at such moment intruding circuit breaker 22 to trip. Each Sampling Processor 1, 2, and 3 reads the trip signal on line 50 at step 148 and sets the flag TRIP to "one" internally. If TRIP is now "one", the maximum sample number N is set to the sum of the present sample index k plus an estimated minimum number of samples which will be available and useful in postfault calculations prior to the circuit breaker 22 actually breaking the circuit of line 24 and terminating the availability of useful postfault samples. As indicated on the flowchart for step 152, at least half a cycle of additional sample sets should be possible to obtain, so N is made equal to k+16, where 16 is half a cycle of sample sets at a sampling rate of 32 samples per cycle.

If at step 150, the flag TRIP is not yet "one", the sample index K is compared with N, still 32, when the program proceeds to step 154. Until sample index k reaches the value of N, the program passes back to step 116 to receive the next sample set. Now that at least one postfault sample set has been received, the program at step 118 bypasses the fault detection and goes directly to step 140, incrementing the sample index k, storing the new sample set in the Postfault Table, and recursively estimating state variables and reaching step 147. If Processor 4 has previously sent a trip signal, the flag TRIP is now 1 and N has been previously set at step 152 on a previous pass. Then since the flag TRIP is "one" at step 147, control passes to step 154 to determine if the sample index k now has been incremented as high as the maximum postfault sample number N. If so, the sampling is completed and the program proceeds to the steps beginning with step 156 for dumping the Prefault Table and the Postfault Table to the Printer 9 through Processor 4.

The Prefault Table is dumped starting with the oldest samples first, using column pointer KR for finding the right place in the Prefault Table to start, and using pointer KR1 as an index variable so that the Prefault Table is accessed in exactly all 64 columns only once. At step 156, KR1 is set to zero. KR is not initialized, since it still contains the column number (from step 120) of the last sample set taken before a fault was detected. Until KR1 reaches 64 at step 162, steps 158 and 160 are executed so as to increment KR1 by 1 and increment KR by 1, modulo 64, at step 158 and then send the sample set from column KR to Processor 4 at step 160.

When the 64 columns of the Prefault Table have been dumped, the program proceeds from step 162 to dump exactly N columns of the Postfault Table for which entries of postfault sample data were made. Referring to FIG. 3A, it is illustratively suggested that the Postfault Table begins with a column 065 and has room for up to 47 columns ending with column 111. The number of columns is related to the sampling rate and the number of cycles for which postfault data is to be taken. In this preferred embodiment, the sampling rate is 32 samples per cycle and $1\frac{1}{2}$ cycles of postfault data are the most being arranged for. $32 \times 1\frac{1}{2} = 48$, but because of the arrangement of steps 152 and 154 in the flowchart of FIG. 3, the most sample sets that will be received is one less, or 47.

At step 164, KR1 is incremented by 1, which initially takes it from the value 64 to the value 65, the number of the first column in the Postfault Table. The sample set from column KR1 is sent at step 166 to Processor 4 for Printer 9. Until KR1 reaches the Postfault Table column 65+N, the column pointer KR1 is incremented at step 164 and sample sets are sent at step 166.

When the Postfault Table has been dumped the program proceeds to step 170 to read the reset line 48 of FIG. 1 and test at step 172 whether a signal has been received indicating that circuit breaker 22 has been reset. The program waits for the reset by cycling through steps 170 and 172 until the reset signal is received, whence the program returns to START 102 and step 104 to begin anew.

FIG. 3B shows a flowchart for the recursive estimation procedure 200 used in Processors 1,2, and 3. Let it be given that the sample index k has just become 1 for the first postfault sample set and that execution is commencing at BEGIN 144. At step 202 an identification variable ID is initialized with the lower identification number ID1, which has been set in Processor 1 as 1 for $V_A$, in Processor 2 as 4 for $I_A$, and in Processor 3 as 6 for $I_C$. later, identification variable ID will be successively incremented by 1 until it reaches the upper identification number ID2, which has been set in Processor 1 as 3 or $V_C$, in Processor 2 as 5 for $I_B$, and in Processor 3 as 7 for $I_o$.

At step 204 a test is made to determine whether this is the first postfault sample, since if it is, the prefault states $X1_o$ and $X2_o$ must first be sent to Processor 4. If k=1 at step 204, then a test is made at step 206 to determine whether the procedure 200 has just been entered or if the identification variable ID has been incremented. If ID is still at the value ID1, then a loop 208,210,212 is executed to send packets of information containing and identifying the prefault states to Processor 4 (via a respective buffer 67,68 or 69), for every electrical quantity.

For instance, Processor 1 sends the prefault states for voltage $V_A$ (ID=1) at step 208 as a packet of information $(1,0,X1_o,X2_o,0)$, where the "1" means $V_A$, the "0" means sample index $k=0$(prefault) and $X1_o$ and $X2_o$ are the prefault state variable values in row 1 of RAM 1R as previously described in connected with FIG. 3 step 138. The trailing "0" is the value of X3 which is zero for all prefault electrical quantities and zero for all voltages in any event.

Next, Processor 1 at step 210 checks to see if ID has reached ID2=3, which it has not. ID is incremented at step 212, and the prefault states of $V_B$ (ID=2) are sent at step 208 as a packet of information $(2,0,X1_o,X2_o,0)$. This time the $X1_o$ and $X2_o$ values referred to are the prefault state variable values in row 2 of RAM 1R.

Next, Processor 1 at step 210 checks to see if ID has reached ID2=3, but is has not. ID is incremented to 3 at step 212, and the prefault states of $V_C$ (ID=3) are sent at step 208 as a packet of information $(3,0,X1_o,X2_o,0)$. This third time the $X1_o$ and $X2_o$ values referred to are the prefault state variable values in row 3 of RAM 1R.

Finally, Processor 1 at step 210 checks to determine if ID has reached ID2=3, and it has. ID is initialized once again to the value ID1 at step 214 and the Kalman Filter recursive estimation calculations commence at step 216.

It will be understood from the foregoing that similar loops 208,210,212 are executed in Processor 2 for ID=4 and 5, and in Processor 3 for ID=6 and 7, and the state variable values are respectively obtained from RAM 2R rows 4 and 5 and RAM 3R, rows 6 and 7.

Because the operaion of the Processors 1, 2, and 3 for carrying out the procedure 200 for estimating the postfault steady-state components is quite similar for each of the Sampling Processors, the description of each of the Processors 1, 2, and 3 is carried out using the same flowchart shown in FIG. 3B. It is to be noted that certain quantities prestored in ROM 1M for Processor 1 are indicated in FIG. 3C and other quantities stored in ROMs 2M and 3M are indicated at FIG. 3D. Since the quantities, or numbers, stored in ROM 3M are the same Kalman Filter numbers stored in ROM 2M, FIG. 3D is used to describe the contents of both ROMs 2M and 3M.

The operation of Processor 1 for estimating the voltage state variables for voltages $V_A$, $V_B$, and $V_C$ is discussed with reference to FIGS. 3B and 3C. Processor 1 reaches step 216 and performs Kalman Filter recursive estimation at steps 216,218,220,222, and 224. The operation of Processor 2 for estimating the $I_A$ and $I_B$ current state variables is discussed with reference to FIGS. 3B and 3D, as is the operation of Processor 3 for estimating the current $I_C$ and $I_o$ state variables. Processors 2 and 3 reach step 216 and perform Kalman Filter recursive estimation using steps 216,217,218, 220,222, and 224 (note the additional step 217). All of the Processors 1, 2, and 3 however, implement the recursive estimation equation $$\hat{X}_k = \phi_{k-1}\hat{X}_{k-1} + K_k(Z_k - H_k\phi_{k-1}\hat{X}_{k-1}) \quad (5)$$

Equation (5) is a matrix equation. In words, the state variables $\hat{X}_k$ for each voltage or current are updated on the basis of the most nearly previously provided set of state variables $\hat{X}_{k-1}$ and the latest postfault sample $Z_k$ for the voltage or current. The state variables are collectively known as a state vector, or simply a "state". It is noted that the overhead carat mark ( ˆ ) indicates that the vector and each element of the vector is an estimate. Thus $\hat{X}_k$ is the kth state estimate for its voltage or current waveform, and $\hat{X}_k$ is comprised of its elements which are the state variable estimates $X1_k$, $X2_k$, and $X3_k$. If there have been no previous postfault samples, the initial state variable estimates $X1_o$, $X2_o$, 0 for each voltage or current are called $\hat{X}_o$ and used for $\hat{X}_{k-1}$, where $k-1$ is 0 (zero). It is taken as a notational convention herein that the carat mark is omitted from the symbols for the elements $X1_k$, $X2_k$, and $X3_k$ of the state vector $\hat{X}_k$, but the elements are estimates and it is to be understood that they are estimates even in the absence of the carat mark.

Voltage Processing

For Processor 1, the respective vector of initial estimates for each voltage $V_A$, $V_B$, and $V_C$ is a 2-row, 1-column vector $$\begin{bmatrix} X1_o \\ X2_o \end{bmatrix}$$

where the entries correspond to the initial estimates $X1_o$ and $X2_o$ for each voltage respectively. For each latest sample set having sample index k, the Procedure 200 updates the state vector $\hat{X}_k$ for voltage $V_A$, then increments the identification variable ID at step 234 and updates the state vector $\hat{X}_k$ being distinct for voltage $V_B$, and then increments the identification variable ID at step 234 again and updates the distinct state vector $\hat{X}_k$ for voltage $V_C$. Thus, there are three different state vectors being updated in Processor 1 corresponding to each voltage.

In Processor 1 the most nearly previous state vectors $\hat{X}_{k-1}$ for $V_A$, $V_B$, and $V_C$ ar stored in RAM 1R at rows 1, 2, and 3 at columns 178, 179, and 180 in the Tempory State Table of RAM 1R. When a state vector has been updated and thus $\hat{X}_k$ is known, the updated state vector $\hat{X}_k$ for a given voltage having identification number ID is stored at the same row and in the same columns as its predecessor $\hat{X}_{k-1}$ was, by overwriting in the memory 1R in step 228. Additionally, at step 230, a packet of information about the latest state vector $\hat{X}_k$ is sent to Processor 4. The packet of information (ID, k, $X1_k$, $X2_k$, $X3_k$) contains in order (A) the identification number ID of the electrical quantity for which the state variables have just been updated, (B) the sample index k for which the updating has occurred, and (C) the three state variables $X1_k$, $X2_k$, and $X3_k$ resulting from the calculation at steps 216 through 224. Notice that for the voltage Processor 1, $X3_k$ is always zero since there is no third state in the voltage estimation, as shown in FIG. 3A Temporary State Table of RAM 1R rows 1, 2, and 3 at column 180. However, the zero is included in the packet of information so that the outputs of Processors 1, 2, and 3 will have identical information format. Upon reaching Processor 4, each packet of information is stored in RAM 4R in the Comprehensive State Table shown in FIG. 4A where the state variable estimates for all identification numbers ID and sample indexes k are kept. For example, the vectors of initial estimates are stored in Comprehensive State Table section 475 of RAM 4R. For another example, the state vector updated for the first postfault sample of voltage $V_B$ is stored in table section 476 in column 2.

Returning to FIG. 3B, the computations for each of the state variable estimates in Processor 1 are now analyzed in additional detail.

The Kalman Filter equation (5) for the voltage state variables has $H_k$ being a 1-row, 2-column vector ( cos $k\theta$, $-\sin k\theta$), where k is again the sample index and $\theta$ (theta) is the angle between successive samples. $\theta$ is $2\pi$ radians divided by sampling rate (here 32 samples per cycle), so here $\theta = \pi/16$ radians. The values for $H_k$ of the trigonometric functions are conveniently prestored in ROM 1M as shown in FIG. 3C in the upper two rows.

The Kalman Filter equation (5) for the voltage state variables has the Kalman Gain vector $K_k$ being a 2-row, 1-column vector $$\begin{bmatrix} K1_k \\ K2_k \end{bmatrix}$$

and the Kalman Gain vector for each sample k is prestored as number values in ROM 1M as shown in FIG. 3C in the lower two rows. Conveniently, the Kalman Gain entries for each sample index k do not differ for the different voltages $V_A$, $V_B$, and $V_C$.

The transition matrix $\phi_k$ in the voltage model is the 2×2 identity matrix $$\begin{bmatrix} 1 & 0 \\ 0 & 1 \end{bmatrix}$$

for all sample indexes k. Accordingly, for the voltages the Kalman Filter recursive estimation Equation (5) is simplified and rewritten as $$\begin{bmatrix} X1_k \\ X2_k \end{bmatrix} = \begin{bmatrix} X1_{k-1} \\ X2_{k-1} \end{bmatrix} + \begin{bmatrix} K1_k \\ K2_k \end{bmatrix} \cdot \left\{ Z_k - (\cos k\theta, -\sin k\theta) \cdot \begin{bmatrix} X1_{k-1} \\ X2_{k-1} \end{bmatrix} \right\} \quad (5A)$$

Equation (5A) is again written in matrix, and it is equivalent to the two algebraic equations $$X1_k = X1_{k-1} + K1_k(Z_k - (X1_{k-1} \cos k\theta - X2_{k-1} \sin k\theta)) \quad (5A1)$$

$$X2_k = X2_{k-1} + K2_k(Z_k - (X1_{k-1} \cos k\theta - X2_{k-1} \sin k\theta)) \quad (5A2)$$

$Z_k$ is the latest postfault value of the voltage for which state variables are being calculated. Since the two equations (5A1) and (5A2) have several multiplications and additions in common, it can be seen by inspection that the Processor 1 can calculate the recursive estimation by as few as 4 multiplications and 4 additions or subtractions per voltage $V_A$, $V_B$, and $V_C$. It is further apparent that since there are the three voltages for which the equations have to be calculated, the Kalman Filtering for the voltages of each sample set having index k is simply three times as many, or 12 multiplications and 12 additions or subtractions.

The calculation procedure Kalman Filter recursive estimation steps in Processor 1 for the voltages is now recapitulated. At step 216 the program retrieves the most recent two state variables (the vector $\hat{X}_{k-1}$) from columns 178 and 179 of the Temporary State Table of FIG. 3A at the row in RAM 1R having the identification number 1D of the voltage for which the state variables are to be updated. Step 217 is skipped in Processor 1.

Next at step 218, the product of $H_k\hat{X}_{k-1}$ is formed by retrieving the values of $\cos k\theta$ and $-\sin k\theta$ from ROM 1M and forming the vector inner product $X1_{k-1} \cos k\theta - X2_{k-1} \sin k\theta$. (2 multiplications and one addition or subtraction).

Next the number resulting from step 218 is subtracted from the voltage value $Z_k$ for the voltage having the identification number ID. (1 addition or subtraction) at step 220. The voltage value $Z_k$ is found by lookup in RAM 1R in the column of the Postfault Table corresponding to the sample index k (column 064+k) in the row having the identification number ID being 1, 2, or 3 depending on which voltage is set down for the calculation.

At step 222, the difference number from step 220 is respectively multiplied by $K1_k$ and $K2_k$, the Kalman Gain numbers from the kth column of the Kalman Filter number table of FIG. 3C in ROM 1M (2 multiplications). This provides 2 updating numbers to add to the previous state variable estimates $X1_{k-1}$ and $X2_{k-1}$ respectively at step 224 (2 additions).

Next Processor 1 goes on at step 228 to store the updated values $X1_k$ and $X2_k$ in the Temporary State Table at columns 178 and 179 by overwriting in the row having identification number ID. Also at step 230 it sends the packet of information about the work just performed in Processor 4 for storage in RAM 4R in the Comprehensive State Table of FIG. 4A.

The identification number ID is tested at step 232, and if it has reached the upper identification number ID2=3, the program reaches RETURN 146. Otherwise, the identification number ID is incremented by 1 at step 234 and the program returns to step 216 to the recursive estimation calculation for the next voltage until all the voltages have their state variable vectors $\hat{X}_k$ estimated. Step 204 is checked before step 216 to be sure k exceeds 1, and if k is 1, step 206 is checked to make sure that ID has been incremented before going directly to step 216.

Current Processing

Processors 2 and 3 both do Kalman Filter recursive estimation of the state variables for the currents in essentially the same manner and so the description of the recursive estimation in each Processor 2 or 3 will be given primarily with Processor 2 as the example, without sacrificing completeness of disclosure.

In Processor 2, the vectors of initial estimates for each of $I_A$ and $I_B$ are three-row, 1-column vectors $$\begin{bmatrix} X1_o \\ X2_o \\ X3_o \end{bmatrix}$$

each having entries corresponding to the initial estimates $X1_o$ and $X2_o$ for each current respectively, the third state $X3_o$ being set to zero (0). For each latest sample set having sample index k, the Procedure 200 updates the state vector $\hat{X}_k$ for the current $I_A$ and then increments the identification variable ID at step 234 and updates the state vector $\hat{X}_k$ being distinct for current $I_B$. Thus, there are two different state vectors being updated in Processor 2, each state vector having 3 entries, the two state vectors corresponding to each of the two currents $I_A$ and $I_B$ respectively.

In Processor 2, the most nearly previous state vectors $\hat{X}_{k-1}$ for $I_A$ and $I_B$ are stored in RAM 2R at rows 4 and 5 and columns 178, 179, and 180 in the Temporary State Table of RAM 2R. When a state vector has been updated and $\hat{X}_k$ is known, the updated state vector $\hat{X}_k$ for a given current having identification number ID is stored at the same row and in the same columns as its predecessor $\hat{X}_{k-1}$ was, by overwriting in the RAM 2R at step 228. Additionally, at step 230, a packet of information about the latest state vector $\hat{X}_k$ is sent to Processor 4. The packet of information (ID, k, X1$_k$, X2$_k$, X3$_k$) contains in order just as in Processor 1 (A) the identification number ID of the electrical quantity for which the state variables have just been updated, (B) the sample index k for which the updating has occurred, and (C) the three state variables X1$_k$, X2$_k$, and X3$_k$ resulting from the calculation at steps 216 through 224. Notice that in current Processor 2, X3$_k$ can take on nonzero values unlike Processor 1, since there is a third state in current formulation, as shown in FIG. 3A Temporary State Table rows 4 and 5 at column 180. Upon reaching Processor 4, a packet of information from Processor 2 is stored in RAM 4R in the Comprehensive State Table shown in FIG. 4A where the states for all identification numbers ID and sample indexes k are kept. For example, the state vector $\hat{X}_k$ updated for the first sample of current I$_A$ is stored in the FIG. 4A Comprehensive State Table section 476 in column 4. For a further example, the state vector updated for the 47th sample of current I$_B$ is stored, if sample index 47 is reached, in the table section 477 in column 5.

Returning to FIG. 3B, let the computations for each of the currents I$_A$ and I$_B$ be analyzed in additional detail for Processor 2.

The Kalman Filter recursive estimation equation (5) for the current state variables has H$_k$ being a 1-row, 3-column vector (cos k$\theta$, −sin k$\theta$, 1), where k is the sample index again, and $\theta$ (theta) is once again $\pi/16$ in this preferred embodiment at sampling rate of 32 samples per cycle. Since the third entry in the H$_k$ row vector is merely 1, or unity, there is no need to prestore it, and only the values for H$_k$ of the trigonometric functions used are prestored in ROM 2M as shown in FIG. 3D in the first two full rows of 48 entries.

The Kalman Filter recursive estimation equation (5) for the state variables for the currents has the Kalman Gain vector K$_k$ being a 3-row, 1-column vector $$\begin{bmatrix} K1_k \\ K2_k \\ K3_k \end{bmatrix}.$$

The Kalman Gain vector for each sample index k is prestored as numbers in the Kalman Filter number table in ROM 2M of FIG. 3D, in the lower three rows. Conveniently, the Kalman Gain vector entries for each sample index k are same for recursive estimations regardless of which electric current is being estimated; and thus the entries in ROM 3M for the Kalman Gain are identical to the entries in ROM 2M.

The transition matrix $\phi_k$ in the formulation for the currents is a 3×3 matrix $$\begin{bmatrix} 1 & 0 & 0 \\ 0 & 1 & 0 \\ 0 & 0 & e^{-\beta\Delta t} \end{bmatrix} \text{ for all sample indexes } k.$$

The expression $e^{-\beta\Delta 6}$ is a constant between zero and 1 which is precalculated and prestored in ROMs 2M and 3M as shown in FIG. 3D. Its derivation is described elsewhere in the present disclosure. For the currents, the Kalman Filter recursive estimation equation (5) is rewritten as $$\begin{bmatrix} X1_k \\ X2_k \\ X3_k \end{bmatrix} = \phi_{k-1} \cdot \begin{bmatrix} X1_{k-1} \\ X2_{k-1} \\ X3_{k-1} \end{bmatrix} + \begin{bmatrix} K1_k \\ K2_k \\ K3_k \end{bmatrix} \cdot \quad (6)$$

$$\left( Z_k - (\cos k\theta, -\sin k\theta, 1) \cdot \phi_{k-1} \cdot \begin{bmatrix} X1_{k-1} \\ X2_{k-1} \\ X3_{k-1} \end{bmatrix} \right)$$

Equation (6) is written in a partially expanded matrix form and is equivalent to the three algebraic equations $$X1_k = X1_{k-1} + K1_k(Z_k - (X1_{k-1} \cos k\theta - X2_{k-1} \sin k\theta + X3_{k-1})) \quad (6A1)$$

$$X2_k = X2_{k-1} + K2_k(Z_k - (X1_{k-1} \cos k\theta - X2_{k-1} \sin k\theta + X3_{k-1})) \quad (6A2)$$

$$X3_k = e^{-\beta\Delta t} \cdot X3_{k-1} + K3_k(Z_k - (X1_{k-1} \cos k\theta - X2_{k-1} \sin k\theta + e^{-\beta\Delta t} \cdot X3_{k-1})) \quad (6A3)$$

$Z_k$ is the latest postfault value of an electrical current for which the state variables X1$_k$, X2$_k$, and X3$_k$ are being calculated.

A heuristic explanation of the recursive estimation equations is now provided to motivate an understanding of their suitability in the state variable estimation process. The more complex formulation for the currents is used as the subject of the explanation. In the current formulation the trigonometric functions cos k$\theta$ and −sin k$\theta$ are simply points taken at each sampling instant with index k on the functions cos wt and −sin wt. The state variable formulation assumes that each electrical current is of the form X1 cos k$\theta$ − X2 sin k$\theta$ + Ce$^{-k\beta\Delta t}$, where C is a real constant and e$^{-k\beta\Delta t}$ is a decaying exponential function in sampling index k. At the inception of the fault F, the values of X1 and X2 are guesstimated at the values of the prefault state variables, and X3 at fault inception is set to 0 as first estimate. Then with the first postfault sample, the first sample Z$_1$ is compared with a calculation of what the sample should be if the guesstimate is correct: (X1$_o$ cos $\theta$ − X2$_o$ sin $\theta$ + 0). The difference between Z$_1$ and the calculation is computed, since this should be related in some way to the amount by which the state variable estimates should be refined. Next the first element of the Kalman Gain K1$_1$ is multiplied by such difference and the product is added to the initial estimate X1$_o$ to get the updated estimate X1$_1$ for the cosine state variable. It is evident that the Kalman Gain first element K1$_1$ must have some a priori intelligence built into it, its manner of calculation being described in connection with FIG. 5A.

To get the negative sine state variable X2$_1$ we multiply the Kalman Gain element K2$_1$ times the difference between sample Z$_1$ and initial estimate (X1$_o$ cos $\theta$ − X2$_o$ sin $\theta$ + 0).

To get the exponential transient state variable X3$_1$ we first multiply the Kalman Gain element K3$_1$ times the difference between sample Z$_1$ and initial estimate (X1$_o$ cos $\theta$ − X2$_o$ sin $\theta$ + 0). Since initial estimate X3$_o$ is zero the foregoing product, without more, is an estimate of the ordinate value of a decaying exponential function at t=0. However, the transient decays by a factor $e^{-\beta\Delta t}/e^{-(k-1)\beta\Delta t}$ (which is equal to $e^{-\beta\Delta t}$) in the time period Δt between successive samples. For this reason, the factor $e^{-\beta\Delta t}$ is provided in the equation (6A3) for updating the third state variable $X3_k$.

Heuristically speaking, the Kalman Filtering process in the present formulation regards $X1_k$ and $X2_k$ as successive approximations approaching certain "correct" consstants as a goal. The correct constants are the proper multipliers of the cosine and negative sine needed to describe the postfault steady-state waveform which ultimately is observed. The third state variable $X3_k$ is somewhat contrasting in that it is regarded as successive approximations approaching the value at each given sample time of a certain "correct" decaying exponential function (not a constant) at that given sample time. In other words, $X3_k$ is supposed to find or "converge" to the curve of a decaying exponential function at every sampling instant. To put it still another way, the "correct" value sought for X3 in the present example formulation is not a constant independent of time, but rather a function which varies with time in the manner of a decaying exponential function.

Returning now to a consideration of the computer burden involved, it is observed that since the three equations (6A1), (6A2), and (6A3) have several multiplications and additions in common, Processor 2 can calculate them by as few as 6 multiplications and 6 additions or subtractions per current $I_A$ and $I_B$. It is further apparent that since there are the two currents in Processor 2 for which the equations have to be calculated, the Kalman Filter recursive estimation for the currents of each sample set having index k is simply twice as many, or 12 multiplications and 12 additions or subtractions.

It is conveniently advantageous that the computer burden of the recursive estimation procedure is divided rather equally at 12 multiplications and 12 additions or subtractions for each of Processors 1, 2, and 3. This accomplished by the selection of the three voltages for Processor 1 and two currents apiece for Processors 2 and 3 in this preferred embodiment.

The Kalman Filter recursive estimation calculation steps in Processor 2 for the currents is now recapitulated. At step 216 of FIG. 3B the program retrieves the most recent three state variables (the vector $\hat{X}_{k-1}$) from columns 178, 179, and 180 of the Temporary State Table in FIG. 3A at the row in RAM 2R having the identification number ID of the current for which the state variables are being updated.

At step 217 the vector $\hat{X}_{k-1}$ is updated or projected ahead by having its third element $X3_{k-1}$ multiplied by the constant $e^{-\beta\Delta t}$ and the product stored at column 180, row ID, by overwriting the third element just multipled. This step implements matrix multiplication of the vector $\hat{X}_{k-1}$ by the matrix $\phi_{k-1}$ as indicated in Equation (6) (and corresponding to Equation (19) of the Kalman Filter mathematics described later). (1 multiplication)

Next at step 218, the product of $H_k\phi_{k-1}\hat{X}_{k-1}$ is formed by retrieving the values of cos $k\theta$ and $-\sin k\theta$ from ROM 2M and forming the vector product $X1_{k-1}$ cos $k\theta - X2_{k-1}$ sin $k\theta + e^{-\beta\Delta t}\cdot X3_{k-1}$, which only requires 2 multiplications and 2 additions or subtractions because the third term was just provided in step 217.

Next the number resulting from step 218 is subtracted from the latest value $Z_k$ for the current having the identification number ID (1 addition or subtraction) at step 220. The current value $Z_k$ is found by lookup in RAM 2R in the column of the Postfault Table corresponding to the sample index k (column 064+k) in the row having the identification number ID, where ID is 4 or 5 corresponding to the current $I_A$ or $I_B$.

At step 222, the difference number from step 220 is respectively multiplied by $K1_k, K2_k$, and $K3_k$, the Kalman Gain numbers from the kth column of the Kalman Filter number table of FIG. 3D in ROM 2M (3 multiplications). This provides 3 updating numbers to add to the previous state variable estimates $X1_{k-1}$, $X2_{k-1}$, and $X3_{k-1}e^{-\beta\Delta t}$ respectively at step 224 (3 additions). It is emphasized that at step 224 with respect to $X3_{k-1}$ the addition is made to the contents of column 180, row ID, which have been updated by step 217, to be just the product $X3_{k-1}\cdot e^{-\beta\Delta t}$ required to implement Equation (6A3), first term. Thus, the addition of $\hat{X}_{k-1}$ contemplated at step 224 of FIG. 3B is the addition of the updated or projected-ahead $\hat{X}_{k-1}$ produced by step 217. The summing provides updated state variable estimates $X1_k$ and $X2_k$ and $X3_k$ directly.

It is emphasized that the symbol $e^{-\beta\Delta t}$ used herein merely stands for a number stored in the ROM 2M or 3M. The number is precalculated and no exponential need be calculated in real time by Processor 2 or 3.

At step 228, Processor 2 goes on to store the updated values $X1_k, X2_k$, and $X3_k$ in the Temporary State Table at columns 178, 179, and 180 by overwriting in the row having identification number ID. Also at step 230, Processor 2 sends a packet of information about the work just performed to Processor 4 for storage in RAM 4R in the Comprehensive State Table of FIG. 4A.

The identification number ID is tested at step 232 and if it has reached the upper identification number ID2=5, the program reaches RETURN 146 in Processor 2. Otherwise, the identification number ID is incremented by 1 at step 234 and the program returns to step 216 to do the recursive estimation calculation for the next current until both of the currents in Processor 2 have their state variables $\hat{X}_k$ estimated. Step 204 is checked before step 216 to be sure that k exceeds 1. If k is still 1, the program checks at step 206 to make sure that ID has been incremented before going directly to step 216.

The foregoing description of Processor 2 designates the Processor as 2, the ROM as 2M, the RAM as 2R, and the current identifications as 4 and 5. The foregoing description also applies exactly to Processor 3 by designating the Processor as 3, the ROM as 3M, the RAM as 3R, and the current identifications as 6 and 7 in such description.

In FIG. 4, the Supervisory Processor 4 begins execution at START 402. Then at step 404 certain variables are initialized. The index IC of number of consecutive times the fault has been classified as the same type is initialized to zero. Index II of number of consecutive times the fault has been found to have resistance and reactance within the Zone 1 impedance danger zone is set to zero. The value in a variable JT1 for holding a just-previous fault classification during the fault classification step 416 is initially set to zero. The flag variable TRIP, which is set to 1 if circuit breaker 22 is instructed to trip, is initialized at zero. The maximum number of sample sets is initially estimated at 32 (1 cycle of samples at the sampling rate selected).

Also at step 404 certain constants are stored. Fault current magnitude-squared threshold ratio E1 is set to 0.49 (square of 0.7). Non-fault current magnitude-squared threshold ratio EP is set to 0.09 (square of 0.3). Three constants for the transmission line 24 are stored as follows: R1 is the value of line resistance per unit length in each phase; X1 is the line reactance per unit length in each phase; and ZZ is a dimensionless ratio $((Z_o-Z_1)/Z_1)$ of the difference (complex number subtraction) of the zero-sequence impedance $Z_o$ and the positive-sequence impedance $Z_1$ to the positive-sequence impedance $Z_1$ (complex number division). Two constants defining an assumed rectangular Zone 1 impedance danger zone for the relay 10 are $R_{zone}$ and $X_{zone}$ respectively being the resistance and reactance in ohms of the resistance and reactance boundary of Zone 1 on a resistance-reactance plane.

At steps 406 and 408 Processor 4 reads the fault signal line 58 of FIG. 1 until a fault signal is detected at step 408. The illustration is also intended to suggest that when Processor 4 is a stationhouse general purpose processor, the fault signal is conveyed to Processor 4 as an interrupt signal at the highest level of priority. Then Processor 4 interrupts its general purpose computing and immediately proceeds with the fault program.

Figure 1B:
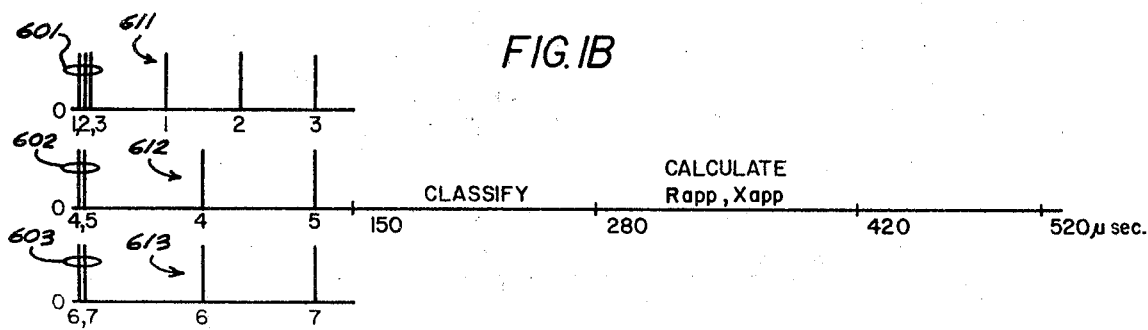
FIG. 1B is a diagram illustrating timing of certain events resulting from the operations of the processors of FIG. 1.

Before describing the fault program in detail, it will be understood that when a fault occurs, Processors 1, 2, and 3 make packets of information available at buffer registers 67, 68, and 69 for limited but adequate periods of time in the timing sequence illustrated in FIG. 1B. Processor 1 makes a triplet 601 of packets of prefault states available to buffer 67 as Processor 1 executes steps 208, 210 and 212 three times, see FIG. 3B. Processor 2 makes a pair 602 of packets of prefault states available to buffer 68 as Processor 2 executes steps 208, 210, and 212 twice. Processor 3 makes a pair 603 of packets of prefault states available to buffer 69 as Processor 3 executes steps 208, 210, and 212 twice. It is contemplated that Processor 4 access buffers 67, 68, and 69 and store their contents in RAM 4R, Comprehensive State Table section 475 of FIG. 4A so that triplet 601, pair 602, and pair 603 of FIG. 1B are stored prior to the arrival of any further packets of information. This storage of the 7 packets in 601, 602, 603 preferably takes no more than 20 microseconds at step 410 of FIG. 4 in Processor 4.

Because the just-mentioned 7 packets in 601, 602, and 603 have prefault information, no action is to be taken upon them until Processor 4 receives the first 7 packets of postfault sample states. Accordingly, at step 412 Processor 4 determines whether it has just read in the packets having a sample index k=0, and if so, returns to step 410 to read in the packets having sample index of 1 before proceeding on further.

In FIG. 1B, Processor 1 sends its first triplet 611 of postfault sample states with a spacing of about 40 microseconds between packets in the triplet 611. Processor 2 sends its first pair 612 of postfault sample states with a spacing of about 60 microseconds between packets in the pair 612. Processor 3 sends its first pair 613 of postfault sample states with a spacing of about 60 microseconds between packets in the pair 613. The spacings are estimated on the basis of 40 microseconds to complete the 4 multiplications and 4 additions or subtractions in recursive estimation in Processor 1, and 60 microseconds to complete the 6 multiplications and 6 additions or subtractions in recursive estimation in Processors 2 and 3.

At step 410 of FIG. 4 Processor 4 accesses buffer 67 and stores the first packet of triplet 611 in FIG. 1B before any packet arrives in pair 612 and 613. Then Processor 4 accesses buffers 68 and 69 about 20 microseconds later and obtains the first packets respectively in pairs 612 and 613 and stores them before the second packet of triplet 611 arrives. Next Processor 4 accesses buffer 67 about another 20 microseconds later and obtains the second packet in triplet 611. Finally, the third packet in triplet 611, and the second packets in pairs 612 and 613 arrive about another 40 microseconds later and are put into buffers 67, 68, and 69 at about the same time. Processor 4 accesses the buffers 67, 68, and 69 and stores the three packets in RAM 4R completing the Comprehensive State Table section 476. The time for obtaining the last three packets just mentioned is preferably on the order of 10 microseconds or less.

It is estimated that Processor 4 can obtain the first recursively estimated state variables for the first postfault sample and store them in RAM 4R within approximately 150 microseconds after the first postfault sample set is received in Processors 1, 2, and 3. It is apparent that after the first postfault sample set, each of Processors 1, 2, and 3 used step 118 of FIG. 3 to bypass steps 120 through 138, so that time constraints are more relaxed for all sample sets after the first postfault set. Referring again to FIG. 1B and having in mind, now, all postfault state variable packets after the first one, triplet 611, pair 612, and pair 613 are sent after each succeeding sample set but triplet 601, pair 602, and pair 603 are absent for each succeeding sample set.

In FIG. 1B, Processor 4 has 520 microseconds (period at 60 Hz. divided by sampling rate of 32 samples per cycle) to complete its work between successive sample sets. Since about 150 microseconds are needed to receive and store the recursively estimated state variables for each sample set, this leaves about 370 microseconds for more operations in Processor 4 relating to fault classification, resistance and reactance calculation and zone checking.

At step 414 of FIG. 4, Processor 4 determines whether the classify index IC has reached 3. Initially IC is zero, of course, and the program proceeds to classify the fault at step 416.

Fault Classification

At step 416, the fault is classified as one of seven types given values respectively of 1,2,3,4,5,6,7 for the classification variable JT. The classifications are defined as 1: line A to ground; 2: line B to ground; 3: line C to ground; 4: line A to line B (or both to ground); 5: line B to line C (or both to ground); 6: line A to line C (or both to ground); and 7: line A to line B to line C (or all to ground). Classifications of JT from 1 to 3 are regarded as line-to-ground faults, and from 4 to 7 as line-to-line faults. A JT of zer (0) denotes an unclassified condition on the line.

Identification variables LF1 and LF2 are provided for identifying up to two faulted lines. If there is a line-to-ground fault, LF1=1 if line A is faulted; LF1=2 if line B is faulted; and LF1=3 if line C is faulted; and LF2=0. If there is a line-to-line fault, LF1 and LF2 are assigned numbers corresponding to the faulted lines, e.g. fault between lines A and C results in LF1=1 and LF2=3. If there is a three-phase fault, JT=7, LF1=1 and LF2=2 in the setting of the variables even through the third line is faulted. LF1 and LF2 are set in fault classification step 416 for use in the resistance and reactance calculation at step 428.

The procedure at fault classification step 416 is detailed as follows:

A. Initialize variables JT=0; LF1=0; LF2=0.

B. Calculate the compensated phase currents-squared for phases A, B, and C from the prefault state variables X1(ID,0) and X2(ID,0) in section 475 of table of FIG. 4A and from the latest postfault state variables X1(ID,k) and X2(ID,k) in the section of FIG. 4A corresponding to sample index k. (ID=4,5, or 6 corresponding to each phase current $I_A$, $I_B$, and $I_C$. In symbols the calculation is:

$$XA = (X1(4,k) - X1(4,0))^2 + (X2(4,k) - X2(4,0))^2$$

$$XB = (X1(5,k) - X1(5,0))^2 + (X2(5,k) - X2(5,0))^2$$

$$XC = (X1(6,k) - X1(6,0))^2 + (X2(6,k) - X2(6,0))^2$$

In words, the value of each compensated phase current-squared is the sum of the squares of the latest state estimates minus the prefault state value.

C. Find the largest of XA, XB, and XC and set a variable XL equal to it.

D. Calculate ratios XKA=XA/XL; XKB=XB/XL; XKC=XC/XL.

E. Test for faults and classify (GT means "exceeds" and LT means "less than"):

IF XKA GT E1 AND XKB LT EP AND XKC LT EP THEN JT=1, LF1=1

IF XKA LT EP AND XKB GT E1 AND XKC LT EP THEN JT=2, LF1=2

IF XKA LT EP AND XKB LT EP AND XKC GT E1 THEN JT=3, LF1=3

IF XKA GT E1 AND XKB GT E1 AND XKC LT EP THEN JT=4, LF1=1, LF2=2

IF XKA LT EP AND XKB GT E1 AND XKC GT E1 THEN JT=5, LF1=2, LF2=3

IF XKA GT E1 AND XKB LT EP AND XKC GT E1 THEN JT=6, LF1=1, LF2=3

IF XKA GT E1 AND XKB GT E1 XKC GT E1 THEN JT=7, LF1=1, LF2=2

This completes step 416.

In the computer time estimation, the compares are estimated to take as long as 2 multiples and step 416 in appears to require computer equivalent to 11 multiplications or divisions and 6 additions or subtractions, or about 120 microseconds.

At step 418, the classify index IC is incremented by 1. Then at step 420, the classification variable JT is tested so that IF JT GT 0 AND IC GT 1 AND JT=JT1 THEN GOTO 424 ELSE GOTO 422. In words, JT1 is a holding variable so that the present fault type JT found at step 416 can be compared with the next earlier type, if any. For example, as long as JT=0, or fault is unclassified, at step 416, the IC index will remain 1 and JT1 will be set to zero by operation at step 422. When JT is classified at step 416 as other than 0 (zero) for the first time, then IC will still be 1 and JT1 will be set to the new value of JT by operation of step 422. If JT is classified at step 416 as other than zero for a second time and classified the same way so that JT=JT1, then the program proceeds to step 424. When the fault has been classified as the same JT for three consecutive times, then step 424 will permit the program to proceed on to step 428, resistance and reactance calculations.

Resistance and Reactance Calculation

At step 428 the program determines which voltage and current state variable estimates are to be used in equations for calculating the resistance and reactance of the faulted line. These decisions involve using different values depending on whether the fault is a line-to-ground fault (JT LT 4), or a line-to-line fault (JT GT 3).

The procedure is laid out in the manner described below:

A. If JT is less than 4, the fault is a line-to-ground fault, and go to paragraph B. If JT is greater than 3, the fault is a line-to-line fault, and go to paragraph D.

B. Line-to-ground fault: The voltage $V_{selected}$ which is selected for further calculations is a complex quantity represented by $V_{selected}=V1+jV2$. Retrieve the state variable estimates corresponding to the latest sample index k for the voltage having identification number same as the faulted line identification LF1. The state variable estimates $X1_k$ and $X2_k$ are found in the Comprehensive State Table in RAM 4R, see FIG. 4A. Set $V1+jV2=X1(LF1,k)+jX2(LF1,k)$. Go to paragraph C.

C. The current $I_{selected}$ which is selected for further calculations is a complex quantity represented by $I_{selected}=I1+jI2$, by definition. $I_{selected}$ is obtained from the data by adding the current in the faulted phase to the product of the impedance ratio ZZ with the zero-sequence current $I_o$. The postfault steady-state phasors for the current in the faulted phase and for the zero-sequence current are needed, and conveniently they are available as the latest estimates in the Comprehensive State Table of FIG. 4A. The phasor component estimates $X1_k$ and $X2_k$ for the faulted phase current are found in the table section corresponding to the latest sample set index k for the current in the column having identification number (LF1+3). The faulted phase identification number LF1 corresponds to the ID identification number for the voltage of that phase, and LF1+3 corresponds to the ID identification number for the current of that phase. The phasor component estimates $X1_k$ and $X2_k$ for the zero-sequence current are found in the table column having identification number 7. Accordingly, the selected current is computed according to the following equation:

$$I1 + jI2 = X1(LF1+3,k) + jX2(LF1+3,k) + ZZ \cdot (X1(7,k) + jX2(7,k)) \quad (7)$$

In words, the selected current $I_{selected}$ is a complex number found by adding the complex number corresponding to the current in the faulted line to the product of the complex number ZZ stored at step 404 multiplied by the complex number zero-sequence current. Computation of $I_{selected}$ utilizes 4 computer multiplications and 4 additions.

Go to paragraph F and calculate resistance and reactance for line-to-ground fault.

D. Line-to-line fault: The voltage $V_{selected}$ which is selected for further calculations is the complex difference of the voltages of the two faulted phases identified by numbers LF1 and LF2. Compute the complex difference $V1+jV2=(X1(LF1,k)-X1(LF2,k))+j(X2(LF1,k)-X2(LF2,k))$.

Go to Paragraph E.

E. The current $I_{selected}$ selected for further calculations for line-to-line fault is the complex difference of the currents of the two faulted phases identified by numbers LF1 and LF2. Compute the complex difference $$I1 + jI2 = (X1(LF1+3,k) - X1(LF2+3,k)) + j(X2(LF1+3,k) - X2(LF2+3,k))$$

Again it is to be noted that to find currents of faulted phases in the Comprehensive State Table, one looks to the columns LF1+3 and LF2+2. For example, if the phases faulted are LF1=1 and LF1=3, the currents are identified as ID=4 and ID=6, being $I_A$ and $I_C$ respectively.

Go to paragraph F and calculate resistance and reactance for line-to-line fault.

F. Resistance and Reactance calculation:

The resistance and reactance of the faulted line apparent to the digital relay 10 are the real and imaginary parts of the apparent impedance of the line. The apparent impedance is $$Z_{app} = R_{app} + jX_{app} = \frac{V1 + jV2}{I1 + jI2} \quad (8)$$

$R_{app}$ is the resistance sought. $X_{app}$ is the reactance sought. The selected complex voltage and complex current in the numerator and denominator respectively of Equation (8) have already been determined in foregoing paragraphs depending on the character of the fault as line-to-ground or line-to-line.

The computer is programmed to calculate $R_{app}$ in the following manner:

$$ISQ = I1 \cdot I1 + I2 \cdot I2$$

$$RAPP = (V1 \cdot I1 + V2 \cdot I2)/ISQ$$

The value of $R_{app}$ is the real part of Equation (8) with the denominator rationalized to be ISQ, of course.

Similarly the computer is programmed to calculate $X_{app}$ as the corresponding imaginary part of Equation (8) as follows:

$$XAPP = (V2 \cdot I1 - V1 \cdot I2)/ISQ$$

The calculation of resistance and reactance evidently requires 8 multiplications or divisions and 3 additions or subtractions to compute Equation (8).

The entire step 428 apparently uses as many as 12 multiplications or additions and 7 additions or subtractions for a computer time of about 140 microseconds.

Referring to FIG. 1B, it is evident that if Processor 4 allows about 150 microseconds for recursive estimation in Processors 1, 2, and 3; allows about 130 microseconds for fault classification at step 416; and allows about 140 microseconds for fault resistance and reactance calculation at step 428, there is still about 100 microseconds left in the 520 microseconds between samples to accommodate all other program steps with timing room to spare. None of the other program steps involve comparably time-consuming arithmetic, so the 520 microseconds appears to be fully adequate for system purposes.

Returning to FIG. 4, the program next proceeds to step 432 after the resistance and reactance have been calculated. If the circuit breaker 22 has not been previously ordered to trip so that the flag TRIP=1, then the program goes to step 434. At step 434, if the sample index k has not reached the maximum allowed number N, the program proceeds to determine at step 436 whether the resistance $R_{app}$ and reactance $X_{app}$ are within the danger zone for a Zone 1 fault.

Step 436 is suitably programmed for any desired shape of the danger zone on the complex number plane of resistance and reactance. In the present work, a simple rectangular zone is used so that the test is merely determining whether or not the impedance is in the first quadrant and both $R_{app}$ is less than the preset (step 404) value $R_{zone}$ and $X_{app}$ is less than the present value $X_{zone}$. In symbols step 436 is IF RAPP LT RZONE AND RAPP GT 0 AND XAPP LT XZONE AND XAPP GT 0 THEN GOTO 440 ELSE GOTO 438.

If the fault is in the zone, the program increments the impedance index II by one at step 440 and checks to determine whether the impedance has been within the zone for at least three times at step 442. If the impedance has not been within the zone for at least three consecutive times (step 442) of if the impedance is not in the zone on the latest calculation at step 436 so that II is reset to zero at step 438, then the program returns to step 410 to wait for and then read the next packets of state variable estimates for the next sample set.

When the impedance has been within the zone for at least three consecutive times (step 442), the program goes to step 444 and sends a TRIP signal on line 50 of FIG. 1 to instruct the circuit breaker 22 to trip and to notify the Processors 1, 2, and 3. The internal flag TRIP is set to 1 at step 446. Since circuit breaker 22 will require some time to actually electrically break the circuit of line 24, the Processor 4 takes advantage of the availability of additional samples by setting at step 448 the maximum sample number N to the sum of the present sample number k plus 16. Regardless of the exact number chosen, whether 16 or another number for the addition, the new number N computed should be the same as the number N computed at step 152 of FIG. 3 in Processors 1, 2, and 3 to keep the system coordinated. After step 448 of FIG. 4, the program returns to step 410 to wait for and then read the next packets of state variable estimates for the next sample set.

It is to be noted that at step 414, the fault classification 416 calculations are bypassed as soon as the fault has been classified securely, by being the same three times in a row. Since these calculations at step 416 consume significant time, provision should be made when the program is about to reach READ step 410 that the Processor 4 will wait in any event until the next sample set has been read by Processors 1, 2, and 3 and new state variables have become available to read at step 410.

When the TRIP flag is a "one" (1) at step 432 and unless the samples state variables received are at the maximum number N at step 452, the program bypasses the zone checking and continues to take samples and calculate resistance and reactance in preparation for ultimately doing a fault locator distance D calculation at step 460 or 462. When at least N sample sets have been taken and their state variables received by Processor 4, the program proceeds from step 452 to step 454 and begins the fault locator calculations and final documentation on Printer 9.

Fault Locator

At step 454 a test is made to determine if the fault is a close-in fault. If it is, no distance calculation is preformed as this would provide no significantly meaningful information. At step 454, a close-in fault is determined when the postfault steady-state voltage-squared for the last (k=N) state variables for the faulted line or line pair is less than 0.01 of the prefault voltage-squared. The postfault voltage in question is simply $V_{selected}$ from the step 428 however it had been calculated depending on the line-to-ground or line-to-line nature of the fault. The prefault states are looked up in the Comprehensive State Table of FIG. 4A in section 475 in the columns having ID numbers the same as the faulted line numbers LF1 and LF2. In symbols, step 454 is IF (JT LT 4 AND V1·V1+V2·V2 LT 0.01 (X1(LF1,0)·X1(LF1,0)+X2(LF1,0)·X2(LF1,0)))
OR (JT GT 3 AND V1·V1+V2·V2 LT 0.01((X1(LF1,0)−X1(LF2,0))²+(X2(LF1,0)−X2-(LF2,0))²)) THEN GOTO 456 ELSE GOTO 458.

The words, if the amplitude of the postfault steady state squared-voltage (which is the sum of the squares of quadrature components V1 and V2) has been loaded down by the fault to the extent that its value is less than 0.01 (same as square of amplitude ratio of 0.1) of the squared voltage in the prefault wave, then there must be a close-in fault. The prefault voltage to use depends on whether the fault is line-to-ground in which case the prefault voltage is the sum of the squares of the states of the prefault voltage on the line which is now faulted. If the fault is line-to-line the prefault voltage is the phase-to phase voltage which is the sum of the squares of the differences of states of the prefault voltages for the respective LF1 and LF2 faulted lines.

If a close-in fault is detected at step 454, the program proceeds to step 456 where it writes on Printer 9 the fault type, the resistance $R_{app}$ and the reactance $X_{app}$, the fact that the fault is close-in, and the time detected. No distance is printed, since calculation would be uninformative. Next, the program at step 466 dumps the sample tables of FIG. 3A for prefault and postfault data and the Comprehensive State Table of FIG. 4A to document the fault. An "Estimate Complete" statement is made at step 468. At steps 470 and 472, Processor 4 reads line 48 of FIG. 1 for a reset signal from circuit breaker 22 and waits until such a reset signal is received. Then the program is returned to initialized step 404 to begin anew.

When at step 454, the fault is not determined to be a close-in fault, the program proceeds to steps 458, 460, and 462 where the appropriate distance calculation formula 460 or 462 is selected depending on whether the fault is line-to-ground (JT LT 4) or line-to-line (JT GT 3).

Distance Calculation for Line-to-Ground Fault

Any suitable distance estimation formula available to the skilled worker is used at step 462. In the present work it is observed that $$R_{app} + jX_{app} = (R1 + jX1)D + \frac{R_F K_F \cdot I_o}{I_{selected}} \quad (9)$$

The distance D to the fault is sought. $R_{app}$ and $X_{app}$ are already calculated from step 428. $I_o$ is the latest estimate of the phasor for the postfault zero-sequence current. $I_{selected}$ is the complex current quantity calculated in step 428. R1 and X1 are the resistance and reactance per unit length, constants for the line stored at step 404. $R_F K_F$ is the product of fault resistance $R_F$ transferred to the measuring point by the factor $K_F$ being the ratio of the fault current to current at the relay location. $R_F K_F$ is unknown for present purposes but can be eliminated from the distance formula, because complex number equation (9) amounts to two equations which can be solved for the distance D. When this is done after considerable manipulation, the distance calculation in symbols is found in terms of the components I1 and I2 of the phasor $I_{selected}$ and the components X1(7,k) and X2(7,k) of the zero-sequence current $I_o$. An intermediate denominator quantity DEN is first calculated followed by the distance D sought: (RAPP is $R_{app}$; XAPP is $X_{app}$)

$$DEN = R1 \cdot (I1 \cdot X2(7,k) - I2 \cdot X1(7,k)) - X1 \cdot (I1 \cdot X1(7,k-) + I2 \cdot X2(7,k))$$

$$D = (RAPP \cdot (I1 \cdot X2(7,k) - I2 \cdot X1(7,k)) - XAPP \cdot (I1 \cdot X1(7,k) + I2 \cdot X2(7,k)))/DEN$$

This completes step 462 of FIG. 4.

Distance Calculation for Line-to-Line Fault

In the present work it is observed that $$R_{app} + jX_{app} = (R1 + jX1)D + \frac{R_F K_F \cdot (I_{FA} - I_{FB})}{I_{selected}} \quad (10)$$

The distance D to the fault is sought. $R_{app}$ and $X_{app}$ are already calculated from step 428. $I_{selected}$ is the complex current quantity calculated in step 428 for line-to-line fault. R1 and X1 are the resistance and reactance per unit length, constants for the line stored at step 404. $R_F K_F$ is the unknown fault quantity as in Equation (9) which is eliminated by algebraic manipulation. $I_{FA}$ and $I_{FB}$ are the compensated fault currents in the lines LF1 and LF2 each current having its prefault components subtracted out. The real and imaginary parts of the complex number difference $(I_{FA} - I_{FB})$ are called IF1 and IF2 respectively. The distance calculation in symbols is given as follows:

$$IF1 = (X1(LF1+3,k) - X1(LF1+3,0)) - X1(LF2+3,k) - X1(LF2+3,0))$$

$$IF2 = (X2(LF1+3,k) - X2(LF1+3,0)) - (X2(LF2+3,k) - X2(LF2+3,0))$$

$$DEN = R1 \cdot (I1 \cdot IF2 - I2 \cdot IF1) - X1 \cdot (I1 \cdot IF1 + I2 \cdot IF2)$$

$$D = (RAPP \cdot (I1 \cdot IF2 - I2 \cdot IF1) - XAPP \cdot (I1 \cdot IF1 + I2 \cdot IF2))/DEN$$

This completes distance calculation 460, of FIG. 4.

It is here noted that the computer time required for the distance D calculation is immaterial, since all samples have been taken and processed that the system needs to spend time on, and real-time constraint of a 520 microsecond interval is absent.

After the distance calculation at steps 458, 460, and 462 is completed by the Processor 4, it executes step 464 and writes out the fault type, the resistance and reactance of the fault, and distance D to the fault, and the time of the fault on Printer 9. Next, it proceeds to table dumping at step 466 and end-routine 468, 470, and 472 as previously described.

Branch 434 provides for an additional contingency. If the fault is not in the length of transmission line 24 of FIG. 1 or is not sufficiently severe to require tripping the circuit breaker 22 at once because the resistance $R_{app}$ and reactance $X_{app}$ are not in the danger of step 436, then the system merely documents the fault. At step 434, if the system has used up all the sample set limit N and not found a secure in-zone determination, it branches to step 450 and writes "Fault Not In Zone" on the Printer 9 of FIG. 1 and proceeds to step 454 and the later steps. Arrival at step 450 also suitably occasions operations for zone-checking an additional Zone 2 of postfault impedance and tripping circuit breaker 22 after a period of several cycles if equipment in lines $L_1$, $L_2$, $L_3$, or $L_4$ has not cleared the fault. Such Zone 2 operations are not however, detailed in the present disclosure.

FIG. 5 illustrates offline prestoring of the Kalman Filter Number Tables of FIGS. 3C and 3D in ROM 1M corresponding to FIG. 3C and in ROMs 2M and 3M corresponding to FIG. 3D. In FIG. 5 an offline processor 5 provided with a RAM 5R executes the program flowcharted in FIG. 5A and stores a Kalman Filter Number Table in a ROM 1M, 2M, or 3M. Subsequently, the ROM is removed from connection with Processor 5 and installed in the system of FIG. 1 in the process of manufacture. Terminal 5T is associated with Proc. 5.

In order to facilitate an understanding of FIG. 5A flowchart, a digression is made to discuss some of the mathematics associated with the fluid of Kalman Filter theory.

Kalman Filter Mathematics

Kalman Filtering has been used extensively in many applications, and is discussed in detail in references such as A. Gelb, *Applied Optimal Estimation*, MIT Press, 1974, and J. S. Meditch, *Stochastic Optimal Linear Estimation and Control*, McGraw-Hill, 1969. This method of filtering is especially well suited to on-line digital processing because the noisy input (measurement) data is processed recursively. The filter is initialized with an initial estimate of the signal and its error covariance. Then as each measurement sample becomes available in real time it is used to update or refine the filter's previous estimate. In the usual situation where the system is observable, the coarse initial estimate is successively improved as more measurement data become available until, eventually, a steady-state condition is reached where no further improvement is obtained.

In the implementation of a Kalman FIlter, a mathematical model of the signals to be estimated is assumed to be of the form $$X_{k+1} = \phi_k X_k + w_k \quad (11)$$

This is the state model for the process to be estimated where
- $X_k$ is the n×1 process state vector at time $t_k$
- $\phi_k$ is the n×n state transition matrix
- $w_k$ is an n×1 vector uncorrelated sequence with known covariance structure.

The observation (measurement) of the process is assumed to occur at discrete points in time in accordance with the relationship $$Z_k = H_k X_k + v_k \quad (12)$$

where
- $Z_k$ is the m×1 vector measurement at $t_k$
- $H_k$ is the m×n matrix giving the ideal (noiseless) connection between the measurement and state vector $X_k$
- $v_k$ is the m×1 measurement error—assumed to be an uncorrelated sequence with known covariance structure.

The covariance matrices for the $w_k$ and $v_k$ vectors are given by $$\overline{w_k w_i^T} = \begin{cases} Q_k & i = k \\ 0, & i \neq k \end{cases} \quad (13)$$

$$\overline{v_k v_i^T} = \begin{cases} R_k & i = k \\ 0, & i \neq k \end{cases} \quad (14)$$

$$\overline{w_k v_i^T} = 0, \text{ for all } k \text{ and } i. \quad (15)$$

Having an a priori estimate $\hat{X}_k^-$ and its error covariance $P_k^-$ the recursive Kalman Filter equations are as follows:

1. Compute the Kalman Gain $K_k$:

$$K_k = P_k^- H_k^T (H_k P_k^- H_k^T + R_k)^{-1} \quad (16)$$

2. Update estimate with measurement $Z_k$:

$$\hat{X}_k = \hat{X}_k^- + K_k(Z_k - H_k \hat{X}_k^-) \quad (17)$$

3. Compute error covariance for updated estimate:

$$P_k = (I - K_k H_k) P_k^- \quad (18)$$

4. Project ahead $$\hat{X}_{k+1}^- = \phi_k \hat{X}_k \quad (19)$$

$$P_{k+1}^- = \phi_k P_k \phi_k^T + Q_k \quad (20)$$

The foregoing is a generalized mathematical statement of the Kalman Filter. It is to be understood that it is not a description of steps to be followed in the flowchart of FIG. 5A. The description of how to apply the theory in the context of the present invention is more fully made elsewhere herein and hereinafter.

In connection with the offline computer system of FIG. 5 it is contemplated that a first computer program called herein the "Offline 2-State Voltage Program" and a second computer program called herein the "Offline 3-State Current Program" are executed depending on which ROM is to be loaded. The Offline 2-State Voltage Program is executed in order to fill ROM 1M for the voltage Processor 1. The Offline 3-State Current Program is executed in order to fill ROM 2M and ROM 3M for each of the current Processors 2 and 3. The Offline 2-State Voltage Program and the Offline 3-State Current Program have sufficient similarity so that only the single flowchart of FIG. 5A has been provided to facilitate the written distinct descriptions of each program, detailed hereinbelow.

Calculations in Offline 2-State Voltage Program

The Offline 2-State Voltage Program begins at START 502 and proceeds to store constants at step 504. The constants are N=32 Sampling rate in samples per cycle.
F=60 Alternating current frequency in Hertz.
$\theta = \pi/16$ Angle between samples equals $2\pi/N$
$T_1 = 0.0033$ Covariance $R_k$ time constant in seconds (see section on transmission line constants.)
$K_v = 0.6$ (per unit)$^2$ Mean-square of the change of sending end voltage of the faulted phase for a fault in the middle of the transmission line. (See further details in section on transmission line constants.)

At step 506, the sample index k is initialized to zero. Step 508 is used to calculate the intermediate matrix $P_{k+1}^-$ (read, P sub k+1 superminus) according to Equation (20). This is a recursive equation which is simplified in the voltage model. The transition matrix $\phi$ is the 2×2 identity matrix and Q is regarded as a zero matrix. Step 508 simply is $$P_{k+1}^- = P_k \quad (21)$$

On the first pass through step 508, k=0, so step 508 calculates $P_1^-$ from an initial P matrix called $P_o$ simply by storing the contents of $P_o$ in $P_1^-$. $P_o$ is a 2×2 identity matrix multiplied by the constant $K_v$ so that $$P_o = \begin{bmatrix} K_v & 0 \\ 0 & K_v \end{bmatrix} \quad (22)$$

At step 510 the sample index k is incremented by 1 (one).

At step 512 the program calculates the covariance $R_k$ mentioned in Equation (14) and in the present work empirically determined by the formula $$R_k = K_v e^{-k/(NFT1)} \quad (23)$$

This formula suggests that the measurement noise dies away, which is consistent with fault observations. On the first pass through step 512, k is 1; and the constants, on all passes, are those stored in step 504. The program calculates the exponential function and multiplies by $K_v$.

At step 514, the program calculates the values of cosine of $k\theta$ and the negative sine of $k\theta$. Theta ($\theta$) is stored at step 504, and on the first pass k is 1, so on the first pass the program calculates the value of $\cos \theta$ and $-\sin \theta$.

The calculation of the first column $K1_1$, $K2_1$ of the Kalman Gain vector in the Kalman Filter Number Table of FIG. 3C occurs on the pass through step 516 the first time. This calculation is made by regarding the row vector $H_k$ to be [$\cos \theta$, $-\sin \theta$] on the first pass and $H_k^T$ as its transpose $$\begin{bmatrix} \cos \theta \\ -\sin \theta \end{bmatrix};$$

$P_k^-$ is the 2×2 matrix just found in step 508, $P_1^-$, since the value of k was incremented at step 510; and $R_k$ is the value just calculated at step 512. The quantity in the calculation of step 516 found in parenthesis—$(H_k P_k^- H_k^T + R_k)$—is merely a scalar, so the matrix inversion indicated at step 516 by the superscript minus one ($-1$) is accomplished in the present work by merely dividing $P_k^- H_k^T$ by the scalar.

To be even more fully detailed in the calculation contemplated at step 516, the matrix equation shown therein is written as the exactly equivalent equation:

$$\begin{bmatrix} K1_k \\ K2_k \end{bmatrix} = \frac{\begin{bmatrix} P_{11}^- & P_{12}^- \\ P_{21}^- & P_{22}^- \end{bmatrix} \cdot \begin{bmatrix} \cos k\theta \\ -\sin k\theta \end{bmatrix}}{[\cos k\theta, -\sin k\theta] \cdot \begin{bmatrix} P_{11}^- & P_{12}^- \\ P_{21}^- & P_{22}^- \end{bmatrix} \cdot \begin{bmatrix} \cos k\theta \\ -\sin k\theta \end{bmatrix} + R_k} \quad (24)$$

Equation (24) for the Kalman Gain vector $K_k$ is equivalent to the two algebraic equations $$K1_k = (P_{11}^- \cos k\theta - P_{12}^- \sin k\theta)/SCALAR \quad (25)$$

$$K2_k = (P_{21}^- \cos k\theta - P_{22}^- \sin k\theta)/SCALAR \quad (26)$$

where $$SCALAR = (\cos k\theta) \cdot (P_{11}^- \cos k\theta - P_{12}^- \sin k\theta) + (-\sin k\theta) \cdot (P_{21}^- \cos k\theta - P_{22}^- \sin k\theta) + R_k \quad (27)$$

The algebraic equations are, of course, derived merely by carrying out the matrix manipulations disclosed by Equation (24). It should be understood that the entries $P_{11}^-$, $P_{12}^-$, $P_{21}^-$, $P_{22}^-$ are in general different on each pass through step 516 and that they are the entries in the kth matrix $P_k^-$. From Equations (21) and (22) it is evident that on the first pass k=1, $P_{11}^- = K_v$, $P_{12}^- = P_{21}^- = 0$, and $P_{22}^- = K_v$.

The program next proceeds to step 518 and stores the values of $\cos \theta$, $-\sin \theta$, $K1_1$ and $K2_1$ on the first pass in the leftmost column in the Kalman Filter Number Table in ROM 1M, FIG. 3C.

At step 520, the program calculates the covariance matrix $P_k$ (notice that $P_k$ is a distinct 2×2 matrix from the matrix $P_k^-$). Step 520 implements Equation (18). This matrix equation can be written as the exactly equivalent equation:

$$\begin{bmatrix} P_{11} & P_{12} \\ P_{21} & P_{22} \end{bmatrix} = \quad (28)$$

$$\begin{bmatrix} (1 - K1_k \cos k\theta) & ((-K1_k)(-\sin k\theta)) \\ ((-K2_k)(\cos k\theta)) & (1 - K2_k(-\sin k\theta)) \end{bmatrix} \cdot \begin{bmatrix} P_{11}^- & P_{12}^- \\ P_{21}^- & P_{22}^- \end{bmatrix}$$

Also, matrix equation (28) can be written as four algebraic equations exactly equivalent to it as:

$$P_{11} = (1 - K1_k \cos k\theta)P_{11}^- + (K1_k \sin k\theta)P_{21}^- \quad (28A)$$

$$P_{12} = (1 - K1_k \cos k\theta)P_{12}^- + (K1_k \sin k\theta)P_{22}^- \quad (28B)$$

$$P_{21} = (-K2_k \cos k\theta)P_{11}^- + (1 + K2_k \sin k\theta)P_{21}^- \quad (28C)$$

$$P_{22} = (-k2_k \cos k\theta)P_{12}^- + (1 + K2_k \sin k\theta)P_{22}^- \quad (28D)$$

On the first pass through step 520, the first values computed at step 518 are used for $K1_k$ and $K2_k$, the Kalman Gain elements; k=1 in the trigonometric functions; and the $P_k^-$ entries are the same as those used in step 518. Step 520 now yields for the four entries in the covariance matrix $P_k$ which is $P_1$ on the first pass. It should be noticed that in step 508 on the first pass, the entries for $P_k$, which was $P_o$, were assumed. Now a refined P matrix has become available at step 520 as $P_1$, and $P_1$ suitably is stored in the same RAM 5R memory locations as $P_o$ was, by overwriting.

In step 522, the program tests the sample index to determine if it has reached 48, and if not, the program passes back to step 508. Now on this latest pass, the entries in $P_k$ are those of the $P_1$ matrix. These entries are now stored into the RAM 5R memory locations for the $P_{k+1}^-$ matrix as well to implement Equation (21), providing the latest values which form the $P_2^-$ matrix.

Sample index k is once again incremented at step 510, at step 512 covariance $R_k$ is calculated according to the next, or incremented, value of k by Equation (23); then at steps 514 and 516 the trigonometric functions and the Kalman Gain entries are calculated for the latest value of k. At step 518, the values of $\cos k\theta$, $-\sin k\theta$, $K1_k$, and $K2_k$ are stored in the kth column of ROM 1M. At step 520, the P matrix is once again updated and step 522 keeps this recursive looping calculation process going until all 48 columns of the Kalman FIlter Number Table are filled, whence the program goes to END 524.

When ROM 1M is filled with its Kalman Filter Number Table, the occasion is also suitable for storing the machine language program flowcharted in FIG. 3 and described hereinbefore for Processor 1. The machine language program is either prepared by hand or with the aid of a compiler from a high-level language and stored in ROM 1M, all in a manner familiar to the computer art, and not shown or described further as being necessary to a complete disclosure.

Calculations in Offline 3-State Current Program

The Offline 3-State Current Program begins at START 502 and proceeds to store constants at step 504.

The constants are

N=32 Sampling rate in samples per cycle.

F=60 Alternating current frequency in Hertz.

$\theta = \pi/16$ Angle between samples equals $2\pi/N$.

$T_1$=0.0033 Covariance $R_k$ time constant in seconds (see section on transmission line constants.)

$K_i$=-(per unit)$^2$ Mean-square of the sending end current in the faulted phase for a fault in the middle of the transmission line. (See further details in section on transmission line constants.)

At step 506, the sample index k is initialized to zero.

In a next step not shown on FIG. 5A, the constant $e^{-\beta\Delta T}$ is computed and stored in ROM 2M as shown in FIG. 3D. This constant is just equal to the exponential $e^{-1/(NFT_1)}$ which can be computed from the constants stored at step 504. $\beta$ is $1/T_1$, and $\Delta t$ is $1/(NF)$, here 0.000520 seconds (520 microseconds).

Step 508 is used to calculate the intermediate matrix $P_{k+1}^-$ (read, P sub k+1 superminus) according to Equation (20). In this equation in the current model, the transition matrix $\phi$ is the same for all sample indexes k and is given as $$\begin{bmatrix} 1 & 0 & 0 \\ 0 & 1 & 0 \\ 0 & 0 & e^{-\beta\Delta t} \end{bmatrix} \quad (29)$$

The Q matrix is also the same for all sample indexes k but has the distinct formulation in this 3-state current model as $$\begin{bmatrix} 0 & 0 & 0 \\ 0 & 0 & 0 \\ 0 & 0 & Q = 0.01 \end{bmatrix} \quad (30)$$

The 3rd row, 3rd column entry was found to be a sensitive quantity in the development of the current model for this preferred embodiment and the best convergence to correct values appeared to result for a value of Q of 0.01, in dimensions of (per unit)$^2$.

The first P matrix for use in Equation (20) is a 3×3 covariance matrix $P_o$ being the constant $K_i$ multiplied by the 3×3 identity matrix so that $$P_o = \begin{bmatrix} K_i & 0 & 0 \\ 0 & K_i & 0 \\ 0 & 0 & K_i \end{bmatrix} \quad (31)$$

The first $P^-$ matrix calculated by Equation (20) in this current model is $P_1^-$ which turns out to be $$P_1^- = \begin{bmatrix} K_i & 0 & 0 \\ 0 & K_i & 0 \\ 0 & 0 & (0.01 + K_i e^{-2\beta\Delta t}) \end{bmatrix} \quad (32)$$

In general, if the $P_k$ matrix is given by $$P_k = \begin{bmatrix} P_{11} & P_{12} & P_{13} \\ P_{21} & P_{22} & P_{23} \\ P_{31} & P_{32} & P_{33} \end{bmatrix} \quad (33)$$

on the kth pass, then the $P_{k+1}^-$ matrix contemplated by Equation (20)

$$\begin{bmatrix} P_{\overline{11}} & P_{\overline{12}} & P_{\overline{13}} \\ P_{\overline{21}} & P_{\overline{22}} & P_{\overline{23}} \\ P_{\overline{31}} & P_{\overline{32}} & P_{\overline{33}} \end{bmatrix} = \begin{bmatrix} P_{11} & P_{12} & P_{13}e^{-\beta\Delta t} \\ P_{21} & P_{22} & P_{23}e^{-\beta\Delta t} \\ P_{31}e^{-\beta\Delta t} & P_{32}e^{-\beta\Delta t} & (P_{33}e^{-2\beta\Delta t} + 0.01) \end{bmatrix} \quad (34)$$

It is contemplated that the coding for step 508 will make the calculations for storage in the 9 RAM 5R storage positions for matrix $P_k^-$ in the manner shown in Equation (34).

At step 510 the sample index k is incremented by 1 (one).

At step 512 the program calculates the covariance $R_k$ for the current model. In the present work $R_k$ for the currents is empirically determined by the formula $$R_k = \tfrac{1}{4} K_i e^{-k/(NFT_1)} \quad (35)$$

It is to be understood that from an observational point of view, the covariance observed depends on the condition of the phase as faulted or unfaulted. However, the sensitivity of the model to $K_i$ is moderately low, so the $K_i$ for a faulted phase is used in the $R_k$ formula for all phases (lines 24A, 24B, 24C, and zero-sequence) because accuracy of calculation is most important for whatever phase(s) is (are) faulted and because only one Kalman Filter number table is required for all currents, thereby.

At step 514, the program calculates the values of cosine of $k\theta$ and the negative sine of $k\theta$ in precisely the same manner as in the Offline 2-State Voltage Program.

The calculation of the first column $K1_1$, $K2_1$, $K3_1$ of the Kalman Gain vector in the Kalman Filter Number Table of FIG. 3D occurs on the pass through step 516 the first time. This calculation is made by regarding the row vector $H_k$ to be $[\cos\theta, -\sin\theta, 1]$ on the first pass and $H_k^T$ as its transpose $$\begin{bmatrix} \cos\theta \\ -\sin\theta \\ 1 \end{bmatrix} ;$$

$P_k^-$ is the 3×3 matrix just found in step 508 according to equation (34) and on the first pass it is given as $P_1^-$ of equation (32), since the value of k was incremented at step 510; and $R_k$ is the value just calculated at step 512. The quantity in the calculation of step 516 found in parenthesis—$(H_k P_k^- H_k^T + R_k)$—is merely a scalar, so the matrix inversion indicated at step 516 by the superscript minus one $(-1)$ is accomplished in the present work by merely dividing $P_k^- H_k^T$ by the scalar.

To be even more fully detailed in the calculation contemplated at step 516 in the current model, the matrix equation shown therein is written as the exactly equivalent equation:

$$\begin{bmatrix} K1_k \\ K2_k \\ K3_k \end{bmatrix} = \frac{\begin{bmatrix} P_{11}^- & P_{12}^- & P_{13}^- \\ P_{21}^- & P_{22}^- & P_{23}^- \\ P_{31}^- & P_{32}^- & P_{33}^- \end{bmatrix} \cdot \begin{bmatrix} \cos k\theta \\ -\sin k\theta \\ 1 \end{bmatrix}}{[\cos k\theta, -\sin k\theta, 1] \cdot \begin{bmatrix} P_{11}^- & P_{12}^- & P_{13}^- \\ P_{21}^- & P_{22}^- & P_{23}^- \\ P_{31}^- & P_{32}^- & P_{33}^- \end{bmatrix} \cdot \begin{bmatrix} \cos k\theta \\ -\sin k\theta \\ 1 \end{bmatrix} + R_k} \quad (36)$$

Performing the matrix multiplications indicated in Equation (36) yields the following set of three algebraic equations to which Equation (36) is exactly equivalent:

$$K1_k = (P_{11}^- \cos k\theta - P_{12}^- \sin k\theta + P_{13}^-)/SCALAR \quad (36A)$$

$$K2_k = (P_{21}^- \cos k\theta - P_{22}^- \sin k\theta + P_{23}^-)/SCALAR \quad (36B)$$

$$K3_k = (P_{31}^- \cos k\theta - P_{32}^- \sin k\theta + P_{33}^-)/SCALAR \quad (36C)$$

where $$SCALAR = (\cos k\theta) \cdot (P_{11}^- \cos k\theta - P_{12}^- \sin k\theta + P_{13}^-) + (-\sin k\theta) \cdot (P_{21}^- \cos k\theta - P_{22}^- \sin k\theta + P_{23}^-) + (1) \cdot (P_{31}^- \cos k\theta - P_{32}^- \sin k\theta + P_{33}^-) + R_k \quad (36D)$$

It is contemplated that equations (36A), (36B), (36C), (36D) will be used for preparing the coding for programming step 516 into Processor 5 for the currents. It should be understood that the 9 entries in the $P_k^-$ matrix are in general different on each pass through step 516.

The program next proceeds to step 518 and stores the values of $\cos \theta$, $-\sin \theta$, $K1_1$, $K2_1$, and $K3_1$ on the first pass in the leftmost column in the Kalman Filter Number Table in ROM 2 M, FIG. 3D.

At step 520, the program calculates the covariance matrix $P_k$ (notice that $P_k$ is a distinct 3×3 matrix from the matrix $P_k^-$). Step 520 implements Equation (18). This matrix equation can be written as the exactly equivalent equation:

$$\begin{bmatrix} P_{11} & P_{12} & P_{13} \\ P_{21} & P_{22} & P_{23} \\ P_{31} & P_{32} & P_{33} \end{bmatrix} = \quad (37)$$

$$\begin{bmatrix} (1 - K1_k \cos k\theta) & ((-K1_k)(-\sin k\theta)) & ((-K1_k)(1)) \\ (-K2_k \cos k\theta) & (1 - K2_k(-\sin k\theta)) & ((-K2_k)(1)) \\ (-K3_k \cos k\theta) & ((-K3_k)(-\sin k\theta)) & (1 - (K3_k)(1)) \end{bmatrix} \cdot$$

$$\begin{bmatrix} P_{11}^- & P_{12}^- & P_{13}^- \\ P_{21}^- & P_{22}^- & P_{23}^- \\ P_{31}^- & P_{32}^- & P_{33}^- \end{bmatrix}$$

Matrix equation (37) corresponds to its exact equivalent in nine algebraic equations indicated by the matrix multiplication indicated therein as follows:

$$P_{11} = (1 - K1_k \cos k\theta)P_{11}^- + (K2_k \sin k\theta)P_{21}^- - K1_k P_{31}^- \quad (37A)$$

$$P_{12} = (1 - K1_k \cos k\theta)P_{12}^- + (K1_k \sin k\theta)P_{22}^- - K1_k P_{32}^- \quad (37B)$$

$$P_{13} = (1 - K1_k \cos k\theta)P_{13}^- + (K1_k \sin k\theta)P_{23}^- - K1_k P_{33}^- \quad (37C)$$

$$P_{21} = (-K2_k \cos k\theta)P_{11}^- + (1 + K2_k \sin k\theta)P_{21}^- - K2_k P_{31}^- \quad (37D)$$

$$P_{22} = (-K2_k \cos k\theta)P_{12}^- + (1 + K2_k \sin k\theta)P_{22}^- - K2_k P_{32}^- \quad (37E)$$

$$P_{23} = (-K2_k \cos k\theta)P_{13}^- + (1 + K2_k \sin k\theta)P_{23}^- - K2_k P_{33}^- \quad (37F)$$

$$P_{31} = (-K3_k \cos k\theta)P_{11}^- + (K3_k \sin k\theta)P_{21}^- + (1 - K3_k)P_{31}^- \quad (37G)$$

$$P_{32} = (-K3_k \cos k\theta)P_{12}^- + (K3_k \sin k\theta)P_{22}^- + (1 - K3_k)P_{32}^- \quad (37H)$$

$$P_{33} = (-K3_k \cos k\theta)P_{13}^- + (K3_k \sin k\theta)P_{23}^- + (1 - K3_k)P_{33}^- \quad (37I)$$

It is contemplated that the above 9 algebraic equations be used for coding the computer to execute step 520 of FIG. 5A.

On the first pass through step 520, the first values computed at step 518 are used for $K1_k$, $K2_k$, and $K3_k$, the Kalman Gain elements. The trigonometric function values used are those for which $k=1$; and the $P_k^-$ entries on the first pass are the same as those used in step 518. Step 520 now yields for the nine entries in the covariance matrix $P_k$, which is $P_1$ on the first pass. It should be noticed that in step 508 on the first pass, the entries for $P_k$, which was $P_o$ were assumed from empirical considerations. Now a refined P matrix has become available at step 520 as $P_1$, and $P_1$ suitably is stored in the same RAM 5R memory locations as $P_o$ was, by overwriting.

In step 522, the program tests the sample index to determine if it has reached 48, and if not, the program passes back to step 508. Now on this latest pass, the entries in $P_k$ are those of the $P_1$ matrix. These entries are now used in executing the calculations of Equation (34) for the $P_{k+1}^-$ matrix, providing the latest values which form the $P_2^-$ matrix.

Sample index k is once again incremented at step 510, at step 512 covariance $R_k$ is calculated according to the next, or incremented value of k by Equation (35); then at steps 514 and 516 the trigonometric functions and the Kalman Gain entries are calculated for the latest value of k. At step 518, the values of $\cos k\theta$, $-\sin k\theta$, $K1_k$, $K2_k$, and $K3_k$ are stored in the kth column of ROM 2M. At step 520, the P matrix is once again updated according to the 9 equations (37) and step 522 keeps this recursive looping calculation process going until all 48 columns of the Kalman Filter Number Table are filled, whence the program goes to END 524.

It is to be understood that ROM 2M has been used as the example for repository of the Kalman Filter Number Table produced by the Offline 3-State Current Program, but that ROM 3M is filled with the same Kalman Filter Number Table produced by the same program.

When ROMs 2M and 3M have been filled with their Kalman Filter Number Table, the occasion is also suitable for storing in each their machine language program flowcharted in FIG. 3 and described hereinbefore for Processors 2 and 3. The machine language program for each is prepared by hand or with the aid of a compiler from a high-level language and stored in ROM 2M and 3M, all in a manner familiar to the computer art, and not shown or described further as being unnecessary to a complete disclosure.

FIGS. 6 and 7 illustrate the advantageous operation of the relay 10 in estimating postfault steady-state current (FIG. 6) and postfault steady-state voltage in a faulted phase (FIG. 7). The postfault quantities predicted by the successive state-variable estimates were plotted versus time elapsed into the first postfault cycle to form the graphs of FIGS. 6 and 7.

FIG. 6 shows the postfult estimate of fault current rapidly rising at portion 602 from the prefault amplitude and in about half a cycle (8 milliseconds) arriving in the neighborhood of the correct value at curve portion 604. Subsequent, the estimate remains essentially at the current value as its asymptote in portion 606.

FIG. 7 shows the postfault estimate of fault voltage rapidly falling at portion 702 from the prefault amplitude. In about half a cycle (8 milliseconds) the voltage estimate also arrives in the neighborhood of the correct value at curve portion 704. Subsequently, the estimate remains essentially at the correct value in portion 706.

Transmission Line Constants

An example transmission line 24 is 160 miles long, 345 KV voltage, driven by a 400 MVA generator 14 through a 400 MVA, 15 KV/345 KV transformer 16. The parameters of the line at 60 Hz. include resistance R1=0.0614 ohms/mile, inductance 1.734 milliHenries/mile, capacitance 18.56 nf/mile, $L_o$=5.9944 mH/mile, $R_o$=0.461 ohms/mile, $C_o$=15 nf/mile. The effect of the capacitance is disregarded for this length of line.

The inductive reactance per mile X1 is 377 rad/sec.×1.734 mH/mile equals 0.654 ohms/mile, which is 377·$L_1$.

The impedance ratio ZZ is $(Z_o-Z_1)/Z_1$. $Z_o$ is $R_o+j377L_o$ equals 0.461+j2.26. $Z_1$ is 0.0614+j0.654. ZZ is computed to be 2.491−j0.377.

The covariance time constant is empirically determined from observations of fault noise. An empirical formula for this time constant $T_1$ is $$T_1 = \tfrac{1}{2} \frac{L_1 \cdot l}{R_1 \cdot l + R_F} \qquad (38)$$

where $L_1$ is the inductance per mile of 1.734 mH/mile; l is half the length of the protected line (the average distance to the fault assuming equal probability of fault at any distance), here 80 miles; $R_1$ is the resistance per mile, here 0.0614 ohms/mile; and $R_F$ is the fault resistance on the order of 10 or 20 ohms. It will be noted that the covariance time constant $T_1$ is by Equation (38) necessarily less than half of the time constant for the line itself, where the line time constant is defined as $L_1R_1$. A value of $T_1$ of 0.0033 seconds is stated as an example value.

The variance constant $K_v$ for the voltage in the faulted phase is the average over the length of the line of the variances of all faults. The variance is observed to be approximately equal to the mean square of the change of the sending end voltage in the faulted phase. This value in turn is approximately equal to the square of the change of the sending end voltage from its prefault amplitude for a fault of average fault resistance halfway down the line. $K_v$ was estimated in the present work at 0.57 per-unit$^2$.

The variance constant $K_i$ for the current in the faulted phase is also the average over the length of the line of the variances of all faults, relative this time to the currents. This variance is essentially the same in approximation to the mean square of the sending end current postfault, in the faulted phase since this is usually so large compared to the prefault current that the latter can be neglected. This value in turn is approximately equal to the square of the sending end current for a fault of average fault resistance halfway down the line. $K_i$ was estimated in the present work at 15 per-unit$^2$. It appeared empirically that the noise departure from the exponential transient was a decaying exponential in variance with initial variance being about a quarter of $K_i$.

The Zone 1 danger zone of resistance and reactance presented to the measuring point is set as the relay engineer finds suitable for the system. Zone 1 should not, of course, include instances of normal loading of the line. In the present example of transmission line, $R_{zone}$ is suitably set for faults of 200 ohms or less. If the fault occurs at the opposite end of the example line at 160 miles, the reactance is as much as 160 miles times 0.654 ohms/mile equals 105 ohms. Accordingly, $X_{zone}$ is set for 105 ohms.

It is contemplated that the skilled worker will check for and compute the transmission line constants for the transmission line that the invention is to be applied to protect. These constants are then stored in the program and ROMs of the digital relay 10 constructed for the given line to be relayed.

In all cases it is to be understood that the hereinabove-described preferred embodiments, arrangements, apparatus, methods, and systems are merely illustrative of a small number of the many possible specific embodiments and methods which can represent applications of the principles of the invention. Numerous and varied other arrangements, embodiments, apparatus, methods and systems can readily be devised in accordance with these principles by those skilled in the art without departing from the spirit and scope of the invention and so the utility of the invention can be fully realized.

What is claimed is:

1. A method of digital distance relaying on an electric power transmission line comprising the steps of
    successively sampling a voltage waveform and a current waveform from said line;
    electronically detecting the existence of a fault on said transmission line from data from said sampling, said sampling obtaining at least two successive pairs of postfault line current and line voltage data;
    recursively electronically calculating in response to each said pair of postfault line current and line voltage data, a voltage waveform sinusoid estimate by means of an estimation procedure having at least two state variables and a current waveform sinusoid estimate by means of an estimation procedure having at least three state variables;

electronically determining whether said voltage and current waveform sinusoid estimates indicate that said fault lies within a predetermined zone; and tripping circuit breaking means for a section of said transmission line corresponding to said zone when said voltage and current waveform sinusoid estimates indicate that said fault lies within said predetermined zone, in automatic response to said determining step.

2. The method of digital distance relaying claimed in claim 1 wherein said method further comprises the steps of electronically storing prior to the detecting of the fault pairs of distinct collections of numbers, said collection pairs respectively corresponding to said pairs of postfault line current and line voltage data; and utilizing each pair of said pairs of distinct collections of numbers in the recursive calculating in response to each said pair of postfault line current and line voltage data to which said each said pair corresponds.

3. The method of digital distance relaying claimed in claim 1 wherein said recursive electronic calculating is performed during parallel processing said voltage estimation procedure and said current estimation procedure.

4. The method of digital distance relaying claimed in claim 1 wherein said two state variables of said voltage estimation procedure correspond to amplitudes in quadrature, and said three state variables of said current estimation procedure correspond to amplitudes in quadrature and a transient waveform component.

5. The method of digital distance relaying claimed in claim 1 wherein each of said estimation procedures is in accordance with discrete Kalman Filtering.

6. A method of digital distance relaying on a three-phase electric power transmission line comprising the steps of successively simultaneously sampling three voltage waveforms and at least three current waveforms from said line;

electronically detecting the existence of a fault on said line from data from said sampling;

providing first, second, and third calculating means;

recursively automatically computing by said first calculating means in response to each postfault sampling of each of said three voltage waveforms, three corresponding voltage waveform state estimates by means of an estimation procedure having at least two state variables for each said voltage waveform state estimate;

recursively automatically computing by said second calculating means in response to each postfault sampling of each of two of said current waveforms, two corresponding current waveform state estimates by means of an estimation procedure having at least three state variables for each said current waveform state estimate;

recursively automatically computing by said third calculating means in response to each postfault sampling of at least the third of said at least three current waveforms, a corresponding current waveform state estimate by means of an estimation procedure having at least three state variables for said third current waveform state estimate; and electronically determining whether said voltage and current waveform state variable estimates indicate that said fault lies within a predetermined zone and generating a circuit breaker tripping signal when said estimates so indicate.

7. The method of digital distance relaying claimed in claim 6 wherein said method further comprises the steps of electronically storing prior to the detecting of the fault a first table of sets of numbers, the sets respectively corresponding to the data for each voltage from said successive sampling, said first table being successively accessed by said first calculating means in said recursively automatically computing said voltage waveform state estimates; and electronically storing prior to the detecting of the fault a second table of sets of numbers, the sets respectively corresponding to the data for each current from said successive sampling, said second table being successively accessed at least by said second calculating means in said recursively automatically computing said current waveform state estimates.

8. In a distance relay having circuit breaker means for isolating a fault in one section of an alternating voltage transmission system, means having a first pair of input terminals energized by the voltage of said line and a second pair of input terminals energized by the current of said line, for providing periodic samples of said voltage and said current to calculating means;

said calculating means being effective to determine the existence of the fault in response to an onset of the fault somewhere in said section and to provide an initial set of estimates including (A) cosine waveform state variable estimates respectively for said voltage and said current occurring subsequent to the onset of said fault, (B) negative sine waveform state variable estimates respectively for said voltage and said current occurring subsequent to the onset of said fault, and (C) at least one transient waveform state variable estimate for said current occurring subsequent to the onset of said fault, said calculating means further being effective to provide an updated set of said estimates all of said state variables during the time period between each pair of consecutive ones of said periodic samples subsequent to the onset of said fault on the basis of the most nearly previous sample of said voltage and the most nearly previous sample of said current and the most nearly previously provided set of said estimates, said calculating means being able to so provide an updated set of said estimates at least twice during the first half cycle after the onset of said fault, utilizing as to sampling data for computing said estimates only samples of said voltage and said current subsequent to the onset of said fault, said calculating means being effective to utilize the cosine waveform state variable estimates and the negative sine state variable estimates so updated in determining whether said fault is located in said one section of said transmission system and to trip said circuit breaker means substantially only when said fault is determined to be located in said one section.

9. The distance relay claimed in claim 8 wherein said calculating means comprises first, second, and third processor means, said first processor means being effective to provide said initial set of estimates and said updated set of estimates as to said voltage;

said second processor means being effective to determine the existence of the fault and to provide said initial set of estimates and said updated set of estimates as to said current;

said third processor means being effective to determine whether said fault is located in said one section and to trip said circuit breaker means.

10. The distance relay claimed in claim 9 wherein said calculating means further comprises first memory means associated with said first processor means having stored therein a first table of sets of numbers, the sets respectively corresponding to the periodic samples of said voltage, said first memory means being accessible by said first processor means for a respective distinct one of said sets of numbers in updating said estimates during the time period between each pair of consecutive ones of said periodic samples of said voltage; and second memory means associated with said second processor means having stored therein a second table of sets of numbers, the sets in the second table respectively corresponding to the periodic samples of said current, said second memory means being accessible by said second processor means for a respective distinct one of said sets of numbers in said second table in updating said estimates for said current during the time period between each pair of consecutive ones of said periodic samples of said current.

* * * * *